United States Patent
Lee et al.

(10) Patent No.: US 11,283,574 B2
(45) Date of Patent: Mar. 22, 2022

(54) EPDCCH COMMON SEARCH SPACE DESIGN FOR ONE OR MORE CARRIER TYPES

(71) Applicant: INTERDIGITAL PATENT HOLDINGS, INC., Wilmington, DE (US)

(72) Inventors: Moon-il Lee, Melville, NY (US); Nobuyuki Tamaki, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 62 days.

(21) Appl. No.: 14/782,251

(22) PCT Filed: Apr. 3, 2014

(86) PCT No.: PCT/US2014/032833
§ 371 (c)(1),
(2) Date: Oct. 2, 2015

(87) PCT Pub. No.: WO2014/165678
PCT Pub. Date: Oct. 9, 2014

(65) Prior Publication Data
US 2016/0043849 A1     Feb. 11, 2016

Related U.S. Application Data

(60) Provisional application No. 61/808,095, filed on Apr. 3, 2013.

(51) Int. Cl.
*H04L 5/00*       (2006.01)
*H04W 72/04*      (2009.01)

(52) U.S. Cl.
CPC ......... *H04L 5/0053* (2013.01); *H04W 72/042* (2013.01); *H04L 5/0048* (2013.01); *H04L 5/0073* (2013.01)

(58) Field of Classification Search
CPC ..... H04L 5/0053; H04L 5/001; H04L 5/0023; H04L 5/0007; H04L 5/0048;
(Continued)

(56) References Cited

U.S. PATENT DOCUMENTS 8,665,811 B2    3/2014  Nory et al.
9,198,181 B2 *  11/2015 Blankenship ......... H04L 5/0039
(Continued)

FOREIGN PATENT DOCUMENTS

CN    101610564 A    12/2009
CN    102549944 A     7/2012
(Continued)

OTHER PUBLICATIONS

3rd Generation Partnership Project (3GPP), R1-113743, "Design of E-PDCCH Search Space", CATT, TSG RAN WG1 Meeting #67, San Francisco, USA, Nov. 14-18, 2011, 3 pages.
(Continued)

*Primary Examiner* — Wutchung Chu
(74) *Attorney, Agent, or Firm* — Condo Roccia Koptiw LLP

(57) ABSTRACT

Embodiments contemplate enhanced physical downlink control channel (EPDCCH). A user equipment (UE) or a wireless transmit/receive unit (WTRU) may receive a first type (e.g., type 1) EPDCCH common search space (CSS) subframe for example is a subset of subframes. The UE or WTRU may monitor first type downlink control information (DCI), for example perhaps within the first type EPDCCH CSS subframe, among other scenarios. A broadcast channel (e.g. MIB) may be received in the first type EPDCCH CSS. The UE or the WTRU may receive configuration information for a second type (e.g., type 2) EPDCCH CSS, for example from the first type EPDCCH CSS. A system information block (SIB) may be received in the second type
(Continued)

EPDCCH CSS. The UE or the WTRU may monitor a second type DCI, for example perhaps in the second type EPDCCH CSS.

16 Claims, 12 Drawing Sheets

(58) Field of Classification Search
CPC ... H04L 5/0094; H04L 1/1861; H04L 5/0037; H04L 5/1469; H04L 5/0092; H04L 5/0035; H04L 5/0051; H04L 5/0073; H04L 5/005; H04L 5/0055; H04L 1/0072; H04L 5/0044; H04L 5/0041; H04L 1/0045; H04L 5/0064; H04L 5/0039; H04L 1/0046; H04L 1/00; H04L 1/0028; H04L 27/26; H04L 1/1812; H04L 1/0038; H04L 1/1854; H04W 72/042; H04W 72/0453; H04W 72/04; H04W 72/0426; H04W 72/1289; H04W 72/0406; H04W 72/044; H04W 72/085; H04W 72/1268; H04W 88/02; H04W 72/048; H04W 72/12; H04W 72/1273; H04W 48/16; H04W 74/04; H04W 24/08; H04W 28/065; H04W 76/28; H04W 72/0446; H04W 72/0413; H04W 52/146; H04W 74/0833; H04W 24/10; H04W 16/14; H04W 48/12; H04J 3/1694; H04J 11/005; H04J 11/0069; H04B 7/2603; H04B 7/2612; H04B 7/0626
See application file for complete search history.

(56) References Cited

U.S. PATENT DOCUMENTS

| | | | |
|---|---|---|---|
| 9,320,023 B2* | 4/2016 | Nory | H04W 74/0833 |
| 9,320,032 B2* | 4/2016 | Gaal | H04L 5/14 |
| 9,391,737 B2* | 7/2016 | Papasakellariou | H04W 72/04 |
| 9,432,138 B2 | 8/2016 | Kang et al. | |
| 9,445,409 B2* | 9/2016 | Liao | H04W 72/042 |
| 9,510,219 B2* | 11/2016 | Kim | H04L 5/0053 |
| 9,629,162 B2* | 4/2017 | Nagata | H04L 5/0064 |
| 9,635,659 B2* | 4/2017 | Gaal | H04W 72/042 |
| 9,681,436 B2* | 6/2017 | Liao | H04L 5/0053 |
| 9,723,626 B2* | 8/2017 | Golitschek Edler Von Elbwart | H04W 72/1289 |
| 9,750,004 B2* | 8/2017 | Xue | H04L 5/0073 |
| 9,907,064 B2* | 2/2018 | Saito | H04W 72/042 |
| 10,555,282 B2* | 2/2020 | McBeath | H04L 5/0053 |
| 2011/0075624 A1 | 3/2011 | Papasakellariou et al. | |
| 2011/0170496 A1 | 7/2011 | Fong et al. | |
| 2012/0281576 A1* | 11/2012 | Yamada | H04L 1/0061 370/252 |
| 2013/0039284 A1 | 2/2013 | Marinier et al. | |
| 2013/0044664 A1* | 2/2013 | Nory | H04L 1/0045 370/311 |
| 2013/0107809 A1* | 5/2013 | Ko | H04L 5/0053 370/328 |
| 2013/0114419 A1* | 5/2013 | Chen | H04W 72/044 370/248 |
| 2013/0121295 A1* | 5/2013 | Saito | H04L 5/0051 370/329 |
| 2013/0215842 A1* | 8/2013 | Han | H04L 5/0053 370/329 |
| 2013/0242882 A1* | 9/2013 | Blankenship | H04L 5/0041 370/329 |
| 2013/0250782 A1* | 9/2013 | Nimbalker | H04L 1/203 370/252 |
| 2013/0250874 A1* | 9/2013 | Luo | H04W 48/12 370/329 |
| 2013/0250880 A1* | 9/2013 | Liao | H04W 72/042 370/329 |
| 2013/0252606 A1* | 9/2013 | Nimbalker | H04B 17/309 455/434 |
| 2013/0301434 A1* | 11/2013 | Krishnamurthy | H04B 7/0617 370/252 |
| 2013/0301542 A1* | 11/2013 | Krishnamurthy | H04W 72/042 370/329 |
| 2013/0315157 A1* | 11/2013 | Krishnamurthy | H04L 5/0073 370/329 |
| 2014/0013191 A1 | 1/2014 | Gong | |
| 2014/0036747 A1* | 2/2014 | Nory | H04W 74/0833 370/311 |
| 2014/0036810 A1* | 2/2014 | Harrison | H04L 5/0094 370/329 |
| 2014/0105154 A1* | 4/2014 | Yang | H04L 5/0053 370/329 |
| 2014/0119266 A1* | 5/2014 | Ng | H04L 27/2602 370/312 |
| 2014/0126485 A1* | 5/2014 | Chen | H04L 27/0012 370/329 |
| 2014/0133331 A1* | 5/2014 | Fu | H04W 48/16 370/252 |
| 2014/0198737 A1* | 7/2014 | Papasakellariou | H04W 74/006 370/329 |
| 2014/0204781 A1* | 7/2014 | Horvat | H04W 24/00 370/252 |
| 2014/0286285 A1* | 9/2014 | Park | H04L 1/0038 370/329 |
| 2014/0286297 A1* | 9/2014 | Zhao | H04L 5/0032 370/329 |
| 2014/0293946 A1* | 10/2014 | Suzuki | H04L 5/0053 370/329 |
| 2014/0301343 A1* | 10/2014 | Park | H04L 5/0053 370/329 |
| 2014/0321399 A1* | 10/2014 | Liu | H04W 72/042 370/329 |
| 2014/0321406 A1* | 10/2014 | Marinier | H04W 72/0413 370/329 |
| 2014/0328302 A1* | 11/2014 | Park | H04W 72/08 370/329 |
| 2014/0341145 A1* | 11/2014 | Nakashima | H04L 5/0053 370/329 |
| 2014/0341180 A1* | 11/2014 | Liu | H04L 5/0051 370/330 |
| 2014/0348077 A1* | 11/2014 | Chen | H04W 92/18 370/329 |
| 2014/0348092 A1* | 11/2014 | Ihm | H04J 11/00 370/329 |
| 2014/0348093 A1* | 11/2014 | Ihm | H04W 72/042 370/329 |
| 2014/0369437 A1* | 12/2014 | Horiuchi | H04W 72/042 375/267 |
| 2015/0003360 A1* | 1/2015 | Liu | H04W 72/1278 370/329 |
| 2015/0043355 A1* | 2/2015 | Kim | H04L 1/1607 370/241 |
| 2015/0131599 A1* | 5/2015 | Xue | H04W 72/042 370/329 |
| 2015/0131605 A1* | 5/2015 | Nogami | H04L 27/2626 370/330 |
| 2015/0181577 A1* | 6/2015 | Moulsley | H04W 72/042 370/329 |
| 2015/0208390 A1* | 7/2015 | Zhao | H04W 72/042 370/330 |
| 2015/0230210 A1* | 8/2015 | Lee | H04L 5/0007 370/329 |
| 2015/0271790 A1* | 9/2015 | Lee | H04W 72/042 455/450 |
| 2015/0296488 A1* | 10/2015 | Shimezawa | H04L 5/0094 370/329 |
| 2015/0372779 A1* | 12/2015 | Lim | H04W 56/003 370/338 |
| 2016/0374063 A1* | 12/2016 | Horiuchi | H04B 7/0689 |

(56) References Cited

U.S. PATENT DOCUMENTS

2017/0207887 A1\* 7/2017 Horiuchi ........... H04W 72/1273
2018/0077700 A1\* 3/2018 Nakashima ........... H04L 1/1861

FOREIGN PATENT DOCUMENTS

| CN | 102573094 A | 7/2012 |
|---|---|---|
| CN | 102624404 A | 8/2012 |
| CN | 103227694 A | 7/2013 |
| EP | 2683098 A2 | 1/2014 |
| WO | WO 2012/109542 A1 | 8/2012 |
| WO | WO 2012/118270 A1 | 9/2012 |

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.
3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.
European Telecommunications Standards Institute (ETSI), TS 136 213 V10.1.0, "LTE, Evolved Universal Terrestrial Radio Access (E-UTRA), Physical Layer Procedures (3GPP TS 36.213 version 10.1.0 Release 10)", Apr. 2011, pp. 1-117.
3rd Generation Partnership Project (3GPP), R1-113655, "Considerations on the ePDCCH Design", TSG RAN WG1 Meeting #67, San Francisco, USA, Nov. 14-18, 2011, 5 pages.
3rd Generation Partnership Project (3GPP), R1-120997, "Discussion on ePDCCH Common Search Space", Huawei, TSG RAN WG1 Meeting #68bis, Jeju, Korea, Mar. 26-30, 2012, 4 pages.
3rd Generation Partnership Project (3GPP), R1-122004, "ePDCCH Fallback", Ericsson, TSG RAN WG1 #69, Prague, Czech Republic, May 21-25, 2012, 2 pages.
3rd Generation Partnership Project (3GPP), R1-123670, "Signaling Solutions to Improve MIB Detection for Victim Cells under the 9dB Bias", Institute for Information Industry (III), TSG RAN WG1 Meeting #70, Qingdao, China, Aug. 13-17, 2012, 4 pages.
3rd Generation Partnership Project (3GPP), R1-123857, Signaling Solutions to Improve MIB Detection for Victim Cells under the 9dB Bias, Institute for Information Industry (III), TSG RAN WG1 Meeting #70, Qingdao, China, Aug. 13-17, 2012, 4 pages.
3rd Generation Partnership Project (3GPP), R1-124610, "Report on the Offline Discussion on the Configuration of Sub Frames for Monitoring", Alcatel-Lucent Shanghai Bell, TSG RAN WG1 Meeting #70bis, San Diego, USA, Oct. 8-12, 2012, 2 pages.
3rd Generation Partnership Project (3GPP), R1-130168, "Consideration of Reference Signals on NCT for Potential Use Case of Rel-12 EPDCCH", Fujitsu, TSG-RAN WG1 Meeting #72, St. Julians, Malta, Jan. 28-Feb. 1, 2013, 2 pages.
3rd Generation Partnership Project (3GPP), R1-112517, "Discussion on ePDCCH Design Issues", Samsung, 3GPP TSG-RAN1#66 Meeting, Athens, Greece, Aug. 22-26, 2011, pp. 1-4.
3rd Generation Partnership Project (3GPP), TS 36.213 V11.2.0, "Technical Specification Group Radio Access Network, Evolved Universal Terrestrial Radio Access (E-UTRA), Physical Layer Procedures (Release 11)" Feb. 2013, 173 pages.
3rd Generation Partnership Project (3GPP), "Requirements and signaling for configuration of UESSS and CSS on ePDCCH", R1-121199, Fujitsu, 3GPP TSG RAN WG1, Meeting #68bis, Jeju, Korea, Mar. 26-30, 2012, 3 pages.

\* cited by examiner

EPDCCH COMMON SEARCH SPACE DESIGN FOR ONE OR MORE CARRIER TYPES

CROSS-REFERENCE TO RELATED APPLICATIONS

This application is the National Stage Entry under 35 U.S.C. § 371 of Patent Cooperation Treaty Application PCT/US2014/032833, filed Apr. 3, 2014, titled "EPDCCH Common Search Space Design For One or More Carrier Types", which claims the benefit of U.S. Provisional Patent Application No. 61/808,095, filed on Apr. 3, 2013, titled "EPDCCH Common Search Space Design For New Carrier type", the entire contents of both of which being hereby incorporated by reference as if fully set forth herein, for all purposes.

BACKGROUND

Communication systems (e.g., a LTE/LTE-Advanced system) may provide multiple antennas, multiple component carriers, and/or quasi-collated antenna ports to support transmissions. Such multiple antennas, multiple component carriers, and/or quasicollated antenna ports may be provided for various purposes including peak system throughput enhancement, extended cell coverage, higher Doppler support, and the like. In such communication systems various carrier types may be provided. In these carrier types, signaling, for example, downlink control channel signaling provided may be inadequate.

SUMMARY

Systems, methods, and instrumentalities are disclosed to provide enhanced physical downlink control channel (EPDCCH). A user equipment (UE) or a wireless transmit/receive unit (WTRU) may receive a first type (e.g., type 1) EPDCCH common search space (CSS) subframe for example is a subset of subframes. The UE or WTRU may monitor first type downlink control information (DCI), for example perhaps within the first type EPDCCH CSS subframe, among other scenarios. A broadcast channel (e.g. MIB) may be received in the first type EPDCCH CSS. The UE or the WTRU may receive configuration information for a second type (e.g., type 2) EPDCCH CSS, for example from the first type EPDCCH CSS. A system information block (SIB) may be received in the second type EPDCCH CSS. The UE or the WTRU may monitor a second type DCI, for example perhaps in the second type EPDCCH CSS.

Systems, methods, and instrumentalities are disclosed to monitor an enhanced physical downlink control channel common search space (EPDCCH CSS). A UE or a WTRU may monitor a first downlink control information (DCI) (e.g., a DCI for a broadcast channel) with a first enhanced control channel element (ECCE) aggregation level set (e.g., 16, 32). The first ECCE aggregation level may be fixed. The first ECCE aggregation level set may be based on a number of physical resource block (PRB) pairs for EPDCCH CSS. For example, if 4 PRB-pairs are used for EPDCCH CSS, the aggregation level set used for the DCIs scrambled, e.g., with SI-RNTI and RA-RNTI may be {8, 16}. The UE or WTRU may monitor a second DCI (e.g., one of other DCIs) with a second ECCE aggregation level set (e.g., 4, 8). The second ECCE aggregation level set may be a configured set of aggregation levels. The first DCI may be scrambled with a first radio network temporary identifier (RNTI) (e.g., system information RNTI (SI-RNTI) or random access RNTI (RA-RNTI). The second DCI may be scrambled with a second RNTI (e.g., transmit power control physical uplink control channel RNTI (TPC-PUCCH-RNTI), transmit power control physical uplink shared channel RNTI (TPC-PUSCH-RNTI)).

Embodiments contemplate one or more techniques for providing enhanced physical downlink control channel (EPDCCH). Techniques may include receiving, by a wireless transmit/receive unit (WTRU), an EPDCCH common search space (CSS) configuration. The EPDCCH CSS configuration may include a designation of one or more subframes. Techniques may include identifying one or more Multicast-Broadcast Single-Frequency Network (MBSFN) subframes with an extended Cyclic Prefix (CP). Techniques may include monitoring the EPDCCH CSS in at least one of the one or more MBSFN subframes with an extended CP.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be examples and in no way limit the scope of the application. As used herein, in one or more embodiments, a User Equipment (UE) may be referred to as a Wireless Transmit/Receive Unit (WTRU), for example.

The enhanced physical downlink control channel (EPDCCH) (e.g., in long term evolution (LTE) release 11) may be used to achieve frequency domain inter-cell interference coordination (ICIC), and beamforming gain. EPDCCH, ePDCCH, and E-PDCCH may be used interchangeably herein. Enhanced resource element group (EREG) and enhanced control channel element (ECCE) may be interchangeably used as EREG and ECCE, respectively.

For example, in Rel-11 of LTE, the EPDCCH resources for a user equipment (UE)-specific search space (USS) may be configured as a subset of PRBs in physical downlink shared channel (PDSCH) region. The EPDCCH resources may be configured in UE-specific manner. One or more EPDCCH resource sets may be configured for a UE.

Figure 1:
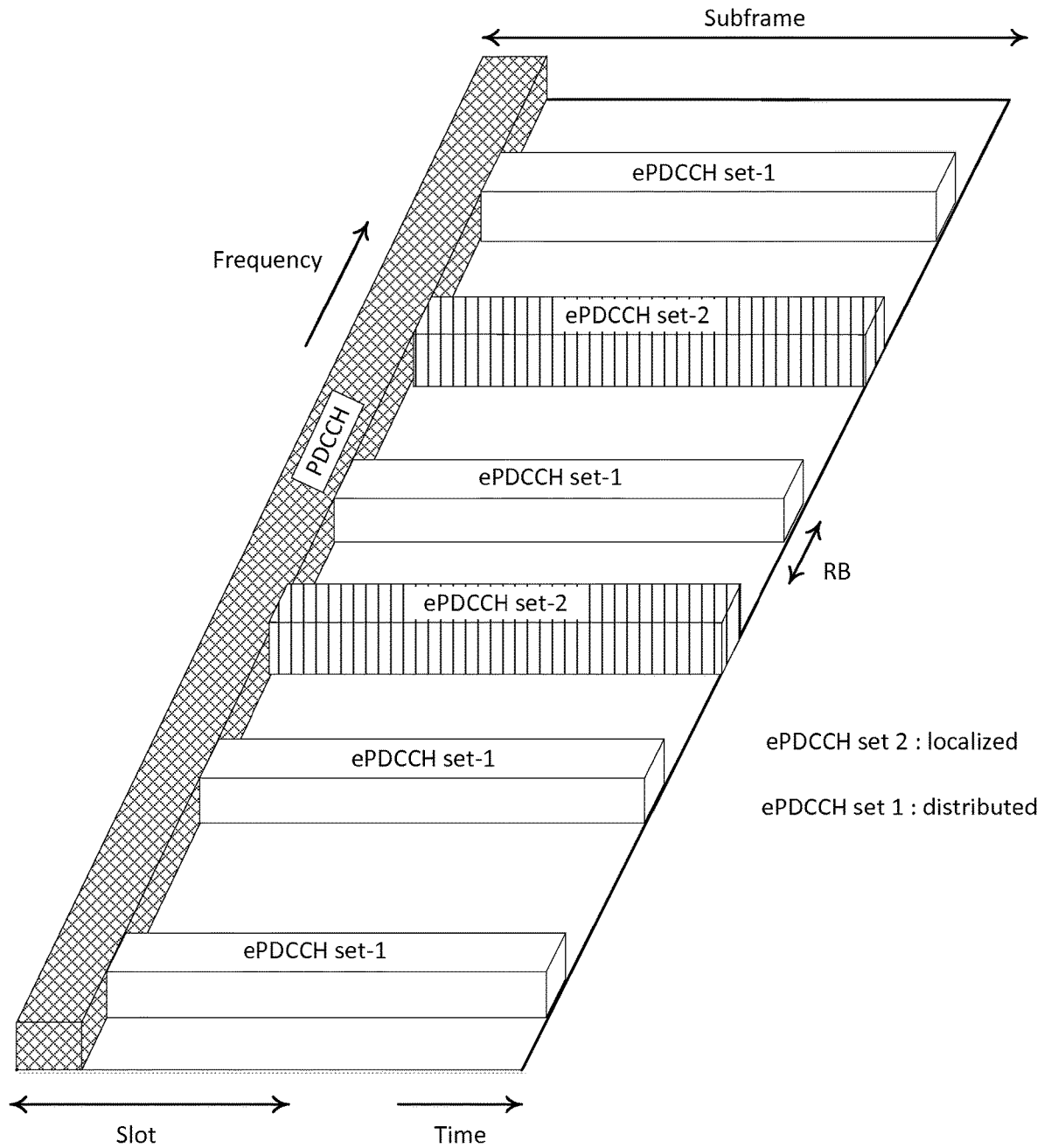
FIG. 1 illustrates an example enhanced physical downlink control channel (EPDCCH) resource configuration.

An EPDCCH resource set may include 2, 4, or 8 PRB-pairs based on the configuration, and may be configured as a localized resource set or a distributed resource set. FIG. 1 illustrates an example EPDCCH resource configuration, where one EPDCCH set may be configured as a localized EPDCCH and the other EPDCCH set may be configured as a distributed EPDCCH.

Figure 2:
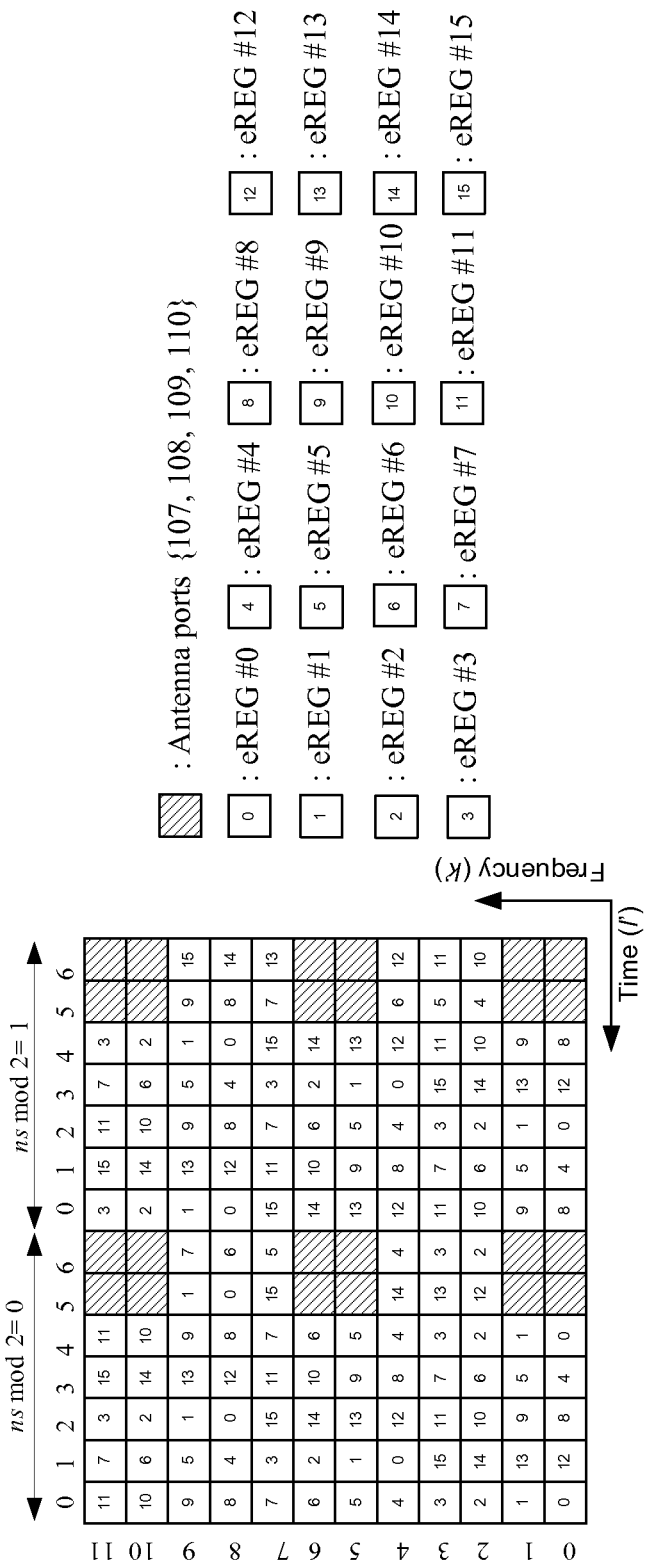
FIG. 2 illustrates an example enhanced resource element group (EREG) definition in a physical resource block (PRB)-pair for a normal cyclic prefix (CP).

In one or more, or each, physical resource block (PRB)-pair that may be configured as EPDCCH resource, perhaps for example regardless of normal cyclic prefix (CP) or extended CP (e.g., 16 enhanced resource element groups (EREGs) may be defined). FIG. 2 illustrates an example EREG definition in a PRB-pair in a normal CP subframe. The resource elements (REs) for the EREGs may be allocated cyclically in a frequency first manner and rate-matched around for the demodulation reference signal RS (DM-RS) such as antenna ports (e.g., 107, 108, 109, 110). The channel estimation performance may be randomized across EREGs as the channel estimation performance may vary according to the RE location in a PRB-pair.

Figure 3:
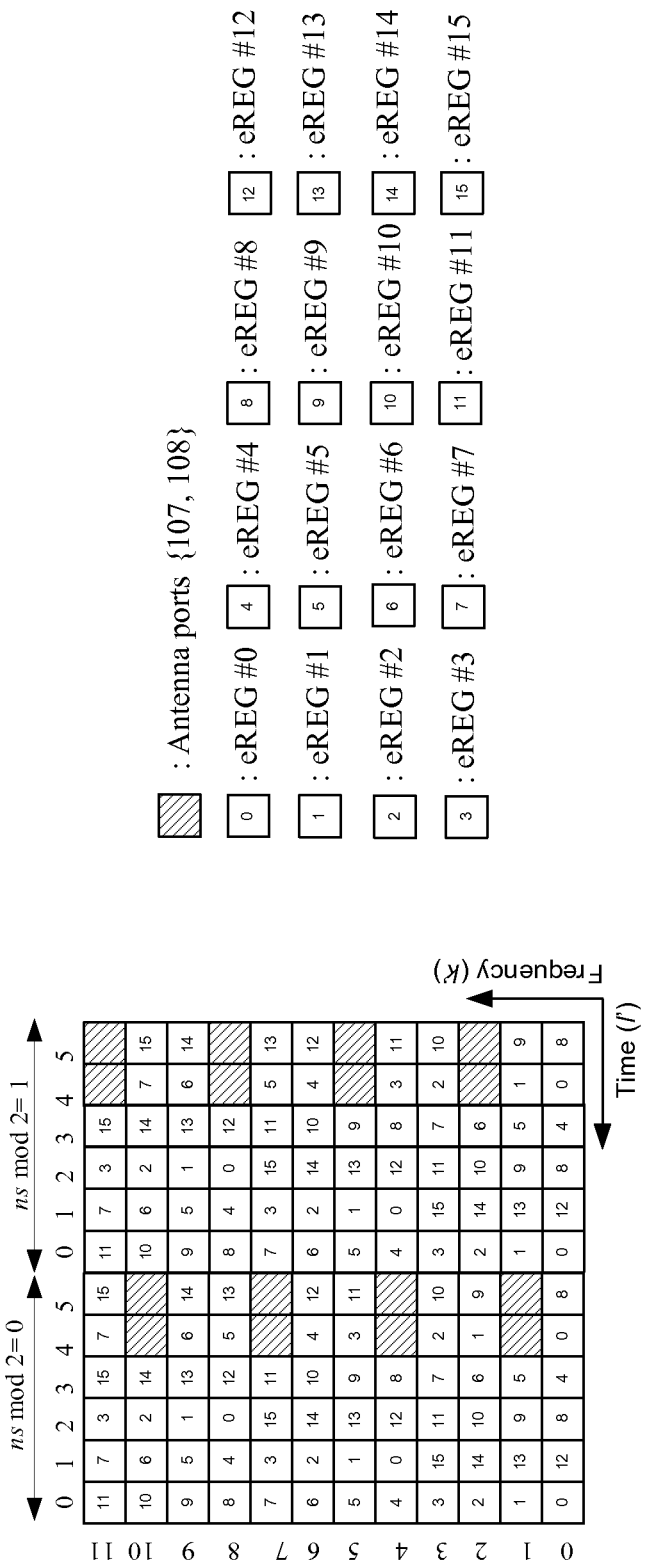
FIG. 3 illustrates an example EREG definition in a PRB-pair for an extended cyclic prefix (CP).

FIG. 3 illustrates an example EREG definition in a PRB-pair for extended CP case. Since antenna ports 107 and 108 may be defined for extended CP, the REs for EREGs may be allocated cyclically in a frequency first manner and rate-matched around for the demodulation RS such as antenna ports (e.g., 107, 108).

An ECCE may be defined as a group of 4 or 8 EREGs within an EPDCCH resource set. The number of ECCEs ($N_{ECCE,set}$) per EPDCCH resource set may be defined as a function of the number of PRB pairs ($N_{PRB,set}$) configured for the EPDCCH resource set, and the number of EREGs grouped to form an ECCE ($N_{EREG}$), such as $N_{ECCE,set}=16\times N_{PRB,set}/N_{EREG}$.

Figure 4:
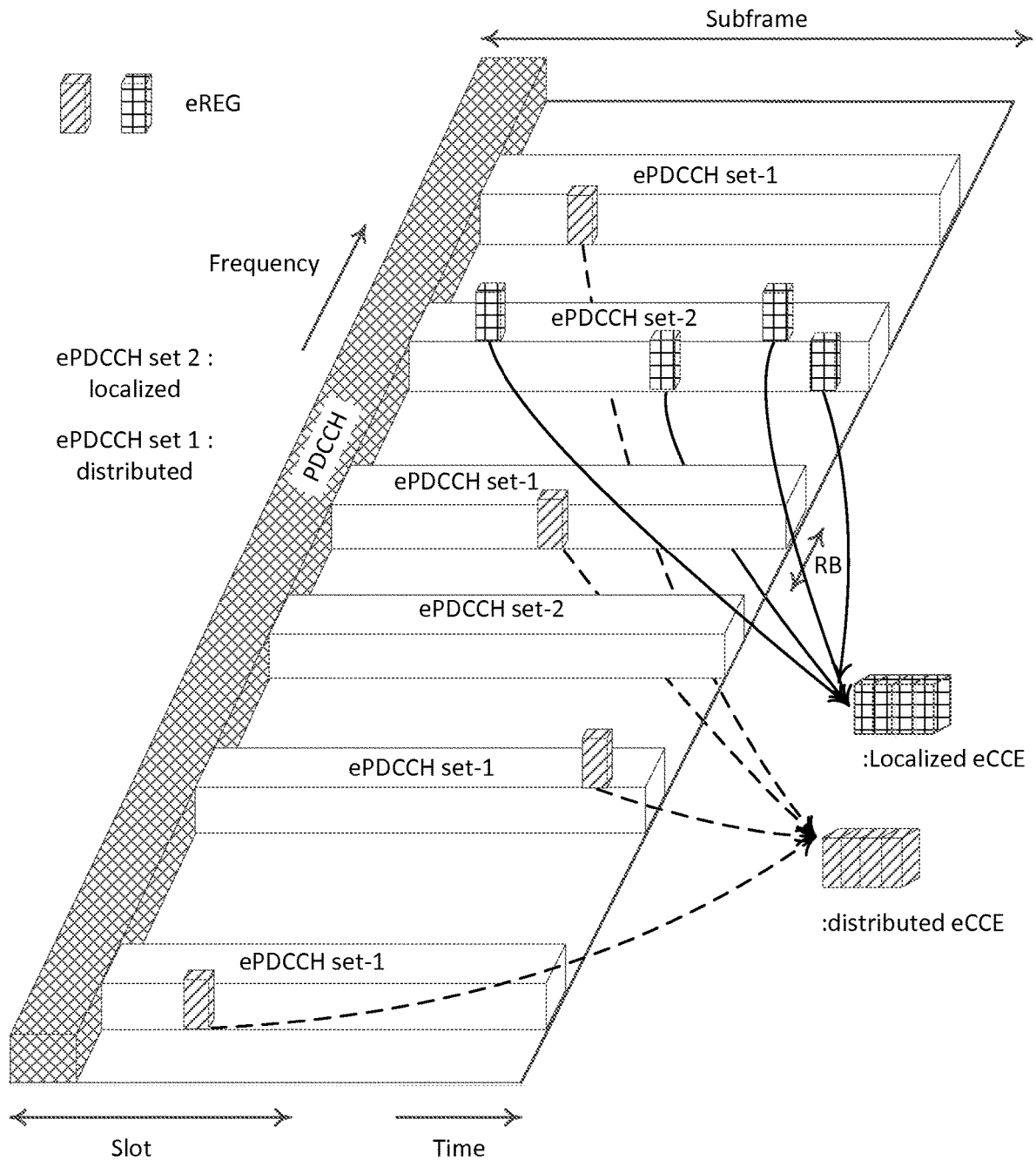
FIG. 4 illustrates an example enhanced control channel element (ECCE) definition for a localized and distributed EPDCCH.

Based on the mode of EPDCCH resource set used, two types of ECCEs may be defined: localized ECCE (L-ECCE) and distributed ECCE (D-ECCE). To form an L-ECCE, 4 or 8 EREGs located in a PRB-pair may be grouped together. The EREGs in PRB-pairs may be grouped to form a D-ECCE. FIG. 4 illustrates example L-ECCE and D-ECCE. The EREGs in an EPDCCH resource set may be used to form L-ECCE and/or D-ECCE according to the EPDCCH transmission configured for the EPDCCH resource set. For example, if an EPDCCH resource set is configured as localized EPDCCH, the EREGs in the EPDCCH resource set may be used to form L-ECCE. In an EPDCCH resource set, L-ECCEs or D-ECCEs may be used.

TABLE 1

| | Normal cyclic prefix | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

Table 1 illustrates an example of the number of EREGs grouped to form an ECCE according to the subframe configurations. For example, 4 EREGs may be grouped to form an ECCE in the case of a normal CP for a normal subframe, and a subframe configuration 3, 4, and 8 in TDD, perhaps since enough of a number of REs may be available per ECCE, so that a coding rate may be determined and/or used (e.g, an appropriate coding rate). In some embodiments, 8 EREGs may be grouped to form an ECCE, for example in the case of extended CP for a normal subframe and/or a subframe configuration 1, 2, 3, 5, and 6 in TDD, perhaps because a number of REs per ECCE may be relatively small to have an appropriate coding rate, among other scenarios.

For example, antenna port sets (107, 108, 109, 110) and (107, 108) may be used for normal CP and extended CP, respectively. According to the EPDCCH transmission mode (e.g., localized EPDCCH and distributed EPDCCH), the antenna port mapping techniques may be different, as one or more, or each, EPDCCH transmission mode may be used for different system and channel environments. For example, antenna port mapping for the distributed EPDCCH may be used to maximize diversity gain, as it may be used for open-loop transmission. Antenna port mapping techniques for localized EPDCCH may be used to exploit UE-specific beamforming gain and multi-user MIMO gain.

Figure 5:
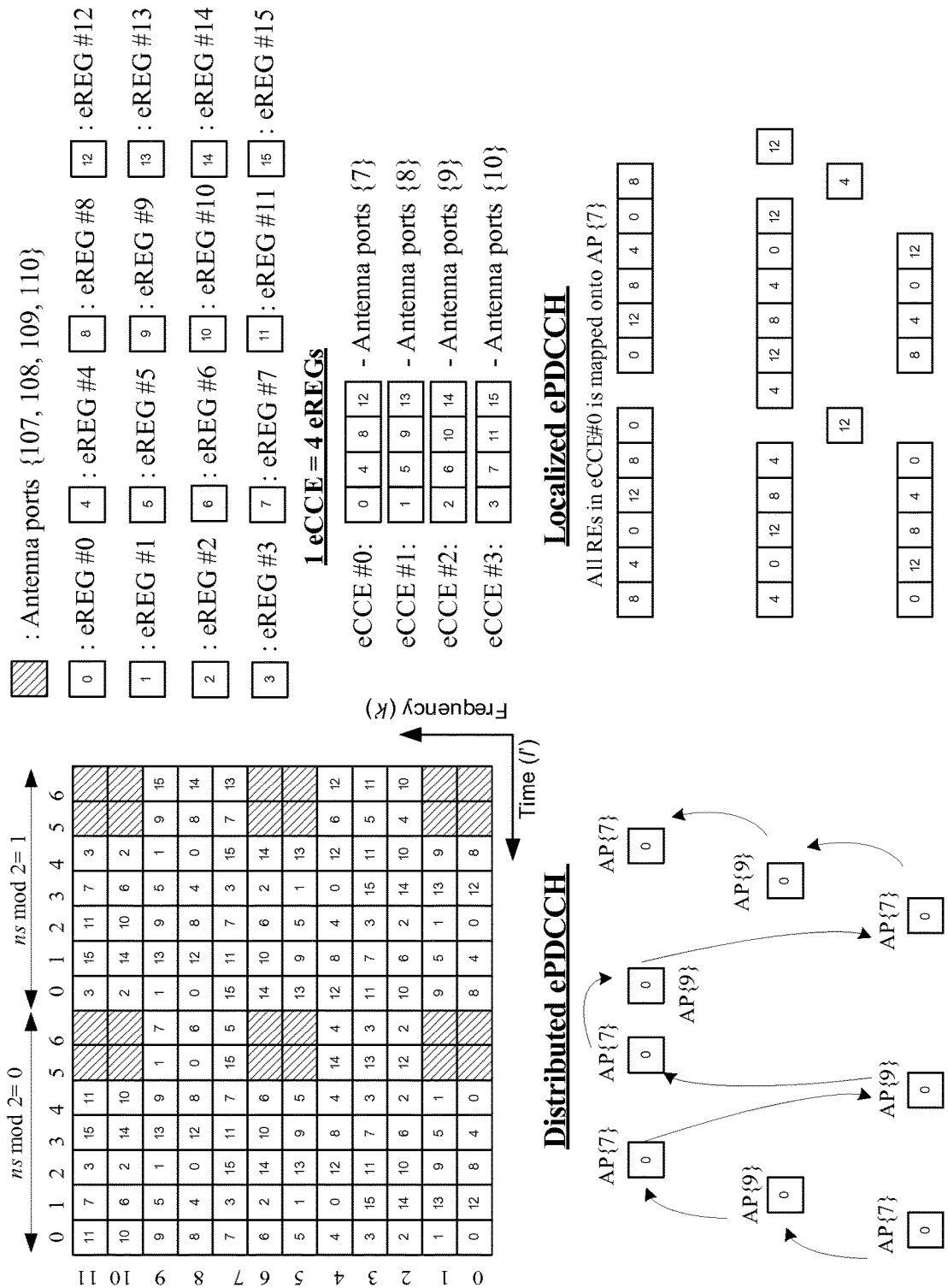
FIG. 5 illustrates an example antenna port mapping for localized and distributed EPDCCH in normal CP.

FIG. 5 illustrates antenna port mapping techniques according to the EPDCCH transmission mode in normal CP case. For the distributed EPDCCH, two antenna ports (e.g., 107, 109) may be used out of (107, 108, 109, and 110) to improve channel estimation gain. The antenna ports 107, 108, 109, and 110 may be used for localized EPDCCH, because the UE-specific beamforming may have larger number of antenna ports. One PRB-pair may be shared with up to 4 UEs, allowing UE-specific beamforming, for example, up to 4 UEs within a PRB-pair.

TABLE 2

| Transmission type | CP type | Subframe type | Ports used in a PRB pair | | | |
|---|---|---|---|---|---|---|
| | | | $n'_{ECCE}=0$ | $n'_{ECCE}=1$ | $n'_{ECCE}=2$ | $n'_{ECCE}=3$ |
| Localized | Normal CP | Normal | 107 | 108 | 109 | 110 |
| | | Special (configs 3, 4, 8) | 107 | 108 | 109 | 110 |
| | | Special (configs 1, 2, 6, 7, 9) | 107 | 109 | N/A | N/A |

TABLE 2-continued

| Transmission type | CP type | Subframe type | Ports used in a PRB pair | | | |
|---|---|---|---|---|---|---|
| | | | $n'_{ECCE} = 0$ | $n'_{ECCE} = 1$ | $n'_{ECCE} = 2$ | $n'_{ECCE} = 3$ |
| | Extended CP | Normal | 107 | 108 | N/A | N/A |
| | | Special (configs 1, 2, 3, 5, 6) | 107 | 108 | N/A | N/A |
| Distributed | Normal CP | | 107, 109 | | | |
| | Extended CP | | 107, 108 | | | |

Table 2 illustrates antenna port distribution for EPDCCH. The ECCE number may be mapped (e.g., one to one) onto an antenna port number in localized EPDCCH transmission, for example perhaps so that a UE (or WTRU) may figure out (e.g., implicitly) which antenna port may be used for demodulation of a L-ECCE (e.g, based on the ECCE number).

A predefined sequence (e.g., a pseudo-random (PN), m-sequence) may be multiplied with downlink RS to minimize inter-cell and/or intra-cell interference, thereby improving channel estimation accuracy and/or increasing multi-user spatial multiplexing gain. For an EPDCCH antenna port (e.g., 107, 108, 109, 110), the reference signal sequence r(m) may be defined by:

$$r(m) = \frac{1}{\sqrt{2}}(1 - 2 \cdot c(2m)) + j\frac{1}{\sqrt{2}}(1 - 2 \cdot c(2m + 1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases},$$

where the $N_{RB}^{max,DL}$ may denote the maximum number of RBs for the downlink system bandwidth and c(i) may denote pseudo-random sequence. The pseudo-random sequence generator may be initialized with:

$$c_{init} = (\lfloor n_s/2 \rfloor + 1) \cdot (2n_{ID}^{EPDCCH} + 1) \cdot 2^{16} + n_{SCID}^{EPDCCH}$$

at the start of one or more, or each, subframe. The $n_{ID}^{EPDCCH}$ may be independently configured for one or more, or each, EPDCCH resource set and $n_{ID}^{EPDCCH} = 2$ may be used.

In LTE release 11, for example, UE-specific search space may be used for EPDCCH and common search space may be located at the PDCCH region. The UE monitoring behavior for downlink control signaling reception may be defined in a downlink subframe as one or more of the following: A UE may monitor UE-specific search space in EPDCCH and common search space in PDCCH, where the EPDCCH monitoring subframe may be configured, e.g., via higher layer signaling. A UE may monitor UE-specific search space and common search space in PDCCH.

A subframe may be configured to monitor EPDCCH, for example perhaps if EPDCCH might not be available in that subframe (e.g., due to collisions between EPDCCH REs and other signals), among other scenarios. The UE-specific search space fallback may be used so that a UE may monitor PDCCH for UE-specific search space.

TABLE 3

| | $N_{ECCE}$ | | | |
|---|---|---|---|---|
| | Normal subframes and special subframes, configuration 3, 4, 8, with $n_{EPDCCH} < 104$ and using normal cyclic prefix | | Each of the other cases | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Table 3 illustrates examples of the supported EPDCCH formats in terms of aggregation levels ($N_{ECCE}$) as a function of the number of available REs ($n_{EPDCCH}$) for EPDCCH in a PRB-pair. As illustrated in Table 3, if the available number of REs is smaller than a threshold $n_{EPDCCH} < 104$), the aggregation level may be larger to keep the similar effective coding rate. For example, the supportable EPDCCH formats for localize transmission when $n_{EPDCCH} < 104$ is $N_{ECCE} \in \{2, 4, 8, 16\}$ while $N_{ECCE} \in \{1, 2, 4, 8\}$ may be used in other cases. Based on the EPDCCH transmission modes, the set of aggregation levels may vary.

Figure 6:
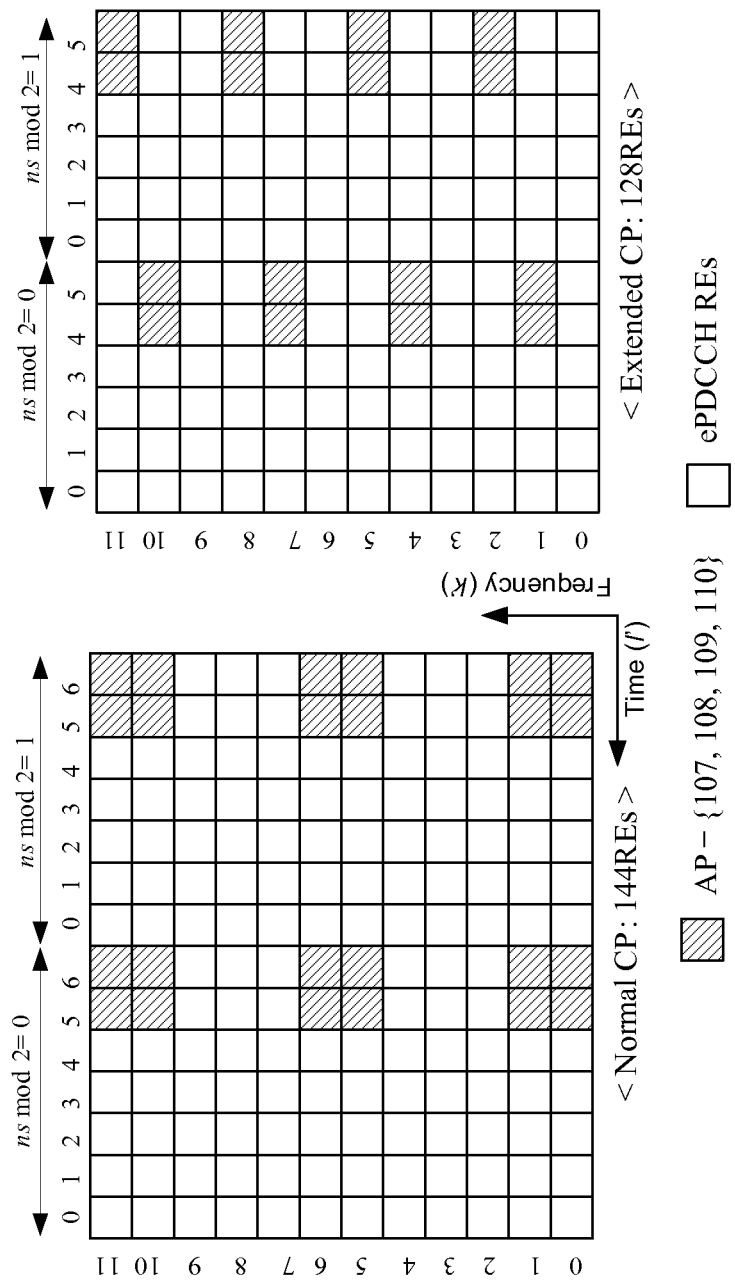
FIG. 6 illustrates an example definition of the EPDCCH resource elements (REs).

The EPDCCH REs may be defined as the REs in a PRB-pair not occupied by antenna port (107, 108, 109, and 110). FIG. 6 illustrates EPDCCH RE definition in a PRB-pair, based on the CP length without collision with other signals, for example resulting in 144 and 128 available REs for normal CP and extended CP, respectively.

The EPDCCH resources may be configured in PDSCH region so that the REs for EPDCCH may collide with other signals, for example, channel state information reference signal (CSI-RS), common reference signal (CRS), positioning reference signal (PRS), physical broadcast channel (PBCH), synchronization channel (SCH), and/or PDCCH. The coded bits for EPDCCH may be rate-matched around for the REs colliding with reference signal (CSI-RS), CRS and PDCCH. The PRB-pair used for PBCH and SCH in a subframe might not be used for EPDCCH. If other signals are transmitted in the PRB-pair configured for EPDCCH, the available REs for EPDCCH may be smaller.

In a carrier type, it may be assumed that PDCCH might not be available, perhaps for example since the CRS might not be transmitted in one or more, or each, of the subframes and/or the CRS might not be used for demodulation purpose, among other scenarios. The CRS may be transmitted in a specific subframe, e.g., with minimum number of antenna port (e.g., perhaps in some embodiments port-0 only). Common search space in PDCCH might not be supported in one or more, or some (e.g., new), carrier types. Common search space may be defined in EPDCCH, perhaps since the common search space may be used for one or more purposes, among other scenarios. The common search space may be used for system information reception, e.g., via system information radio network temporary identity (SI-RNTI). The common search space may be used for paging reception, e.g., via paging RNTI (P-RNTI). The common search space may be used for random access channel (RACH) response reception, e.g., via random access RNTI (RA-RNTI). The common search space may be used for group based uplink power control, e.g., via transmit power control (TPC)-physical uplink control channel (PUCCH)-RNTI or TPC-physical uplink shared channel (PUSCH)-RNTI. The common search space may be used for uplink grant reception, e.g., via temporary cell RNTI (C-RNTI). The common search space may be used for multicast control channel (MCCH) change notification, e.g., via Multimedia Broadcast and Multicast Service (MBMS) RNTI (M-RNTI).

Broadcasting channels might not be transmitted via EPDCCH until the RRC connection setup is finished, perhaps for example since EPDCCH resources might not be configured via higher layer signaling (e.g., radio resource control (RRC) signaling). A UE might not finish the RRC connection setup, for example perhaps as the UE might not transmit and receive signals appropriately (e.g., without broadcasting information). Cell-specific EPDCCH resource may be defined so that one or more, or each, of the UEs may receive broadcasting signals from the beginning.

The reference signal sequence for EPDCCH may be initialized with higher layer configured EPDCCH ID that may be UE-specific configuration. The EPDCCH common search space might not use the initialization sequence, as the EPDCCH monitoring in the common search space may be before the RRC connection setup. The reference signal sequence for EPDCCH common search space may be redefined so that it may be possible to detect the signals before RRC connection setup.

Since during the initial cell access process the UE-specific configuration based signals including, for example, the CSI-RS signal might not be informed to a UE when the UE starts reading the common search space. The UE might not know the collision between EPDCCH REs and CSI-RS. The UE behavior of rate-matching around the CSI-RS for EPDCCH reception might not be applicable.

The set of ECCE aggregation levels of EPDCCH UE-specific search space may vary, for example, based on the number of available REs in a subframe to provide similar effective coding rate. The effective coding rate may be provided irrespective of the fact that the subframe and the available REs may heavily depend on the CSI-RS configuration. The EPDCCH common search space may be monitored before a UE figure out the CSI-RS configuration. The ECCE aggregation level change might not be used for common search space as UE-specific search space. The common search space monitoring behavior may be different after the UE may find out the UE-specific reference signal configurations including, e.g., CSI-RS.

The UE behavior may be undefined, for example perhaps when the resources of EPDCCH UE-specific search space and common search space may be overlapped (e.g., perhaps for example because of no EPDCCH common search space may be available). Due to one or more different properties between UE-specific search space and common search space, the UE behavior may be defined how to monitor common search space when UE-specific search space resource is overlapped with common search space.

The EPDCCH common search space (CSS) may be configured and/or defined in a subset of subframes. The EPDCCH common search space may be located in the predefined subframes. A UE may monitor common search space in the predefined subframes. For example, the subframe 0 and 5 may include EPDCCH CSS so that a UE may monitor DCIs transmitted in CSS in the subframe 0 and 5. In another example, the subframe 0, 4, 5, and 9 may include EPDCCH CSS. Subframes configured as multimedia broadcast multicast service single frequency network (MBSFN) subframes may include EPDCCH CSS. If EPDCCH is transmitted in the subframes 0 and 5, the downlink control information (DCI) scrambled with SI-RNTI and RA-RNTI may be supported in the EPDCCH CSS, and the DCIs scrambled with other RNTIs may be supported in the EPDCCH USS.

The EPDCCH may be transmitted in the subframes, e.g., 0, 4, 5, and 9, the DCIs scrambled with SI-RNTI, RA-RNTI, and P-RNTI may be supported in the EPDCCH CSS and DCIs scrambled with other RNTIs may be supported in the EPDCCH USS. The DCI scrambled with a RNTI may imply that the 16 bit cyclic redundancy check (CRC) for the DCI may be scrambled with a specific RNTI so that a UE may be informed from the detected RNTI that the DCI may be used for the type of control channel.

The EPDCCH CSS supporting subframes and a subset of the EPDCCH CSS supporting subframes may support a specific type of DCI. For example, a DCI scrambled with SI-RNTI may be transmitted in the subset of the EPDCCH CSS supporting subframes and the DCI scrambled with RA-RNTI may be transmitted in the other subset of the EPDCCH CSS, where the two subsets may be partially or fully overlapped. For example, a DCI scrambled with SI-RNTI may be transmitted in the subframes 0 and 5, perhaps for example so that a UE may assume that the DCI scrambled with SI-RNTI is in the subframes 0 and 5. A DCI scrambled with RA-RNTI may be transmitted in one or more, or each, of the EPDCCH CSS supporting subframes. In another example, the DCIs scrambled with SI-RNTI and RA-RNTI may be transmitted in the subframes 0 and 5. The DCI scrambled with P-RNTI may be transmitted in one or more, or each, of the EPDCCH CSS supporting subframes. The DCIs scrambled with M-RNTI may be transmitted in MBSFN subframes, for example, in subframes configured by higher layers. The EPDCCH CSS in MBSFN subframes may be in extended CP.

The EPDCCH CSS supporting subframes may be configured via higher layer signaling and/or broadcasting channels in a semi-static manner. EPDCCH CSS supporting subframes may be indicated in broadcasting channel such as a physical broadcast channel (PBCH), for example in which a master information block (MIB) may be carried. For example, multiple EPDCCH CSS supporting subframe configurations may be defined, and one of the configurations may be indicated in PBCH. A UE may receive the EPDCCH CSS subframe configuration information at the PBCH and/or may start monitoring EPDCCH CSS in the subframes indicated to receive system information (SIB).

Two types of EPDCCH CSS supporting subframes may be defined, for example type-1 EPDCCH CSS and type-2 EPDCCH CSS. The type-1 EPDCCH CSS supporting subframes may be indicated in a PBCH and the type-2 EPDCCH CSS supporting subframes may be indicated in a SIB. A UE may receive the type-1 EPDCCH CSS supporting subframes from PBCH and may start monitoring type-1 DCIs transmitted in the type-1 EPDCCH CSS. From the type-1 EPDCCH CSS, the UE may receive an SIB that may contain configuration information for the type-2 EPDCCH CSS supporting subframes. The UE may start monitoring type-2 DCIs transmitted in the type-2 EPDCCH CSS. The type-1 DCI may be DCI(s) scrambled with SI-RNTI and the type-2 DCI may be DCI(s) scrambled with other RNTIs transmitted common search space including RA-RNTI, P-RNTI, TPC-PUCCH-RNTI, and/or TPC-PUSCH-RNTI.

For example, three types of EPDCCH CSS supporting subframes may be defined, where the type-1 EPDCCH CSS supporting subframes may be indicated in the PBCH and the type-2 EPDCCH CSS supporting subframes may be indicated in a SIB, and the type-3 EPDCCH CSS supporting subframes may be indicated, e.g., via higher layer signaling. In one or more, or each, type of EPDCCH CSS supporting subframes, a subset of DCIs transmitted in CSS may be monitored by UE. For example, a UE may monitor type-1 DCI(s) in type-1 EPDCCH CSS supporting subframes, and type-2 DCI(s) in type-2 EPDCCH CSS supporting subframes. The type-1 EPDCCH CSS supporting subframes may overlap (e.g., partially or fully) with type-2 EPDCCH CSS supporting subframes. The same may apply for the type-2 EPDCCH CSS supporting subframes, type-3 EPDCCH CSS supporting subframes, type-1 EPDCCH CSS supporting subframes, and/or type-3 supporting subframes.

The EPDCCH CSS supporting subframes may be configured (e.g., implicitly) as a function of physical cell-ID. A UE may detect physical cell-ID from synchronization channel (SCH) and the physical cell-ID detected from SCH (e.g., implicitly) may indicate the subset of the subframes supporting EPDCCH CSS.

The implicitly indicated subset of subframes may be defined as type-1 EPDCCH CSS supporting subframes. A UE may monitor type-1 DCI(s) in the type-1 EPDCCH CSS supporting subframes. For example, type-1 DCI may be the DCI(s) scrambled with SI-RNTI. The UE may receive, for example from type-1 DCI, the configuration information for the type-2 EPDCCH CSS supporting subframes in which type-2 DCI may be received. The type-2 DCI(s) may be the DCIs scrambled with at least one of RA-RNTI, P-RNTI, TPC-PUCCH-RNTI, TPC-PUSCH-RNTI, and temporary C-RNTI. Two or more of types of EPDCCH CSS supporting subframes may be defined and a subset of DCIs transmitted in CSS may be transmitted in a specific type of EPDCCH CSS supporting subframes.

CRS (e.g., antenna ports 0 to 3) may be transmitted in subframes, e.g., 0 and 5 and other subframes might not have CRS. Two types of common search space may be defined as type-1 CSS and type-2 CSS, where the type-1 CSS may be located in the subframe 0 and 5, and the type-2 CSS may be located in the subframes other than 0 and 5. The type-1 CSS may use CRS for demodulation. The type-2 CSS may use DM-RS (e.g., antenna ports 107 to 110) for demodulation. The type-1 CSS may be PDCCH CSS and the type-2 CSS may be EPDCCH CSS. The type-1 CSS may be located within center 6 RBs and the REs not overlapped with primary and/or secondary synchronization signals (PSS/SSS) and PBCH may be used. The type-2 CSS may be located in the system bandwidth. The type-1 CSS may be used to transmit system information related to master information block (MIB). The type-2 CSS may be used to transmit system information related to system information blocks (SIBs) and others.

The EPDCCH CSS may be configured/defined in a subset of the subframes and the EPDCCH USS may be shared with CSS in other subframes not supporting EPDCCH CSS. The DCIs supported in CSS may be transmitted in the EPDCCH CSS in the subframe supporting EPDCCH CSS. The DCIs may be transmitted in the EPDCCH USS in the subframe not supporting EPDCCH CSS. A UE may monitor DCIs in both EPDCCH USS and CSS resources in the subframes supporting EPDCCH CSS. The UE may monitor DCIs in EPDCCH USS resources in which DCIs for both USS and CSS may be transmitted in the subframes not supporting EPDCCH CSS. When the EPDCCH USS resources are shared for CSS DCIs, the search space for CSS DCIs may be in the fixed location. For example, the starting ECCEs for CSS may be fixed for one or more, or each, one of the aggregation levels. The starting ECCE number for CSS in EPDCCH USS resource may be defined as a function of physical or virtual cell-ID used for the EPDCCH USS resource. In an example, the EPDCCH candidates for CSS DCIs in the EPDCCH USS resources in the subframe not supporting EPDCCH CSS may be a subset of EPDCCH candidates for USS, resulting in the number of blind decoding attempts remained same.

The information for initial cell access may be transmitted in an EPDCCH CSS, which may imply that PBCH (e.g., MIB) might not be supported in a carrier type (e.g., a new carrier type). A UE may receive the system information, e.g., in a PBCH including, for example, an SFN number, downlink system bandwidth, and/or PHICH configuration. For example, two or more types of EPDCCH CSSs may be defined. The type-1 EPDCCH CSS may be used to carry the system information in MIB and may include one or more of full or part of SFN number, downlink bandwidth in terms of number of PRBs, and (e)PHICH configuration. The type-2 EPDCCH CSS may be used to carry the system information in SIBs.

The type-1 EPDCCH CSS may be located in the center 6RBs in a predefined subset of subframes. The predefined subset of subframes may be subframe 0 in one or more, or each, of the radio frames, or another subframe except for subframes 0 and 5. The subframe for type-1 EPDCCH CSS may be one subframe in one or more, or each, of the radio frames and the subframe may be implicitly defined as a function of physical cell-ID by using modulo operation. The subframe 0 and 5 might not be a candidate for the type-1 EPDCCH CSS. The type-1 EPDCCH CSS may be located in the center 6RBs in one or more, or each, of the subframes except for the subframes 0 and 5, perhaps for example since the DM-RS may be colliding with synchronization channels, among other scenarios. The type-1 EPDCCH, for example for the subframe 0 and 5, might not be transmitted, perhaps so that a UE might not try to monitor type-1 CSS in these subframes, among other scenarios.

The type-2 EPDCCH CSS may be located over the system bandwidth indicated from the system information received from the type-1 EPDCCH CSS and one or more of the subframes may include type-2 EPDCCH CSS. For example, the system information in the type-1 EPDCCH CSS may indicate the subset of subframes that may be used for type-2 EPDCCH CSS. One or more, or each, of the subframes may be used for type-2 EPDCCH CSS.

The EPDCCH resources may be configured and/or defined differently according to or based on the EPDCCH search space type. For example, the EPDCCH common search space may be configured in a cell-specific manner and the UE-specific search space may be configured in a UE-specific manner.

The EPDCCH CSS resource may be configured via at least one of the following. A minimum set of PRB pairs may be configured in a specific time and/or frequency location in a predefined manner. For example, 4 PRB-pairs or 6 PRB-pairs may be defined as a minimum set of PRB pairs for the common search space and the center 4 or 6 PRB-pairs in the downlink system bandwidth may be used for common search space.

In the subframe containing PSS/SSS and/or PBCH, the location of common search space may be located next to the center 6 PRB-pairs if the downlink system bandwidth may be larger than 6 PRB-pairs. In this embodiment, the 4 or 6 PRB-pairs may be equally divided and located in both sides of center 6 PRB-pairs. The PRB pairs for the common search space may also be extended in a UE-specific manner. In this embodiment, the minimum set of PRB pairs may be considered as the first EPDCCH common search space set and the UE-specific common search space extension may be considered as the second EPDCCH common search space set. Two EPDCCH common search space sets may be configured and one of them may be configured in a cell-specific manner and the other may be configured in a UE-specific manner. The cell-specific configuration may be informed via broadcasting channel. The UE-specific configuration may be informed via UE-specific RRC signaling.

A subset of DCI formats that may be transmitted in the common search space may be monitored in a cell-specific common search space and the others may be monitored in a US-CSS. For example, DCI formats 1A/1B/1C may be monitored in the cell-specific common search space and DCI formats 3/3A may be monitored in the US-CSS. Additionally, the UE-specific common search space may be configured via higher layer signaling or signaled in a broadcasting channel. For example, two EPDCCH CSS resource sets may be configured and the first EPDCCH CSS resource set may be predefined in a fixed location. The second EPDCCH CSS resource set may be configured via broadcasting channels (e.g., such as MIB or SIB) and/or higher layer signaling (e.g., RRC signaling). The number of PRB-pairs for EPDCCH CSS may be defined and/or configured as a function of system bandwidth. For example, n1 PRB-pairs may be used, if the system bandwidth is smaller than b1, otherwise n2 PRB-pairs may be used for EPDCCH CSS.

The UE-specific search space may be configured via at least one of the following. In an embodiment, a UE-specific EPDCCH resource set may be defined as a set of a number of PRBs. For example, one of the 2, 4, or 8 PRB pairs may be configured for a UE-specific EPDCCH resource set via higher layer signaling. A bitmap may be used to indicate the PRB-pairs configured for common search space. Up to two UE-specific EPDCCH resource sets may be configured per UE and the two UE-specific EPDCCH resource sets may be overlapped partially or fully in PRB pairs.

The PRB pairs for a UE-specific search space and the PRB pairs for a common search space may be overlapped. The second EPDCCH CSS resource set may be overlapped with a UE-specific EPDCCH resource set, where, for example, the second EPDCCH CSS set may be a UE-specific common search space or a cell-specific common search space. If two EPDCCH common search space resource sets are configured, the two EPDCCH common search space resource sets may be overlapped with each other.

Two or more types of EPDCCH CSS may be defined in which the PRB pairs for the type-1 EPDCCH CSS may be defined in a predefined location within center 6 PRB-pairs and/or the PRB pairs for type-2 EPDCCH CSS may be defined according to the configuration. The type-1 EPDCCH CSS may be defined by using a subset of PRBs among center six (6) PRB-pairs. For example, three (3) PRB-pairs may be used out of six (6) PRB-pairs and the three (3) PRB-pairs located in an interlaced manner, perhaps so that the $1^{st}$, $3^{rd}$, $5^{th}$ PRB-pairs among center six (6) PRB-pairs may be used or $2^{nd}$, $4^{th}$, $6^{th}$ PRB-pairs among centre six (6) PRB-pairs may be used. Consecutive three (3) PRB-pairs may be used in order to achieve PRB bundling gain. The number of PRB-pairs for type-1 EPDCCH CSS may be the same and/or smaller than six (6). The type-2 EPDCCH CSS may be configured from the system information received at the type-1 EPDCCH CSS. The system information may include PRB-pair configuration information for the type-2 EPDCCH CSS.

The number of PRB-pairs for EPDCCH CSS may vary according to the subframe configuration. For example, if normal subframes and special subframes, configuration 3, 4, 8, with $n_{EPDCCH}$<104 and using normal cyclic prefix, the $2 \times N_{CSS}$ PRB-pairs may be used for EPDCCH CSS and $N_{CSS}$ PRB-pairs may be used in other cases. The set of ECCE aggregation levels for EPDCCH CSS may become double when $2 \times N_{CSS}$ PRB-pairs are used as compared with the configuration of $N_{CSS}$ PRB-pairs for EPDCCH CSS. The $N_{CSS}$ may be a predefined number or configured from multiple candidates, e.g., 4, 8, 12. When multiple candidates are used, the $N_{CSS}$ may be selected as a function of system bandwidth, CP length, and/or TDD subframe configuration.

The full and/or reduced CRS (e.g., antenna ports 0~3) may be transmitted in a subset of subframes in one or more, or each, of the radio frames. For example, the CRS may be transmitted in subframes 0 and 5 in one or more, or each, of the radio frames. The starting symbol of EPDCCH CSS may be dynamically indicated in the subframes 0 and 5 from PCFICH transmitted in the subframe. The starting symbol of EPDCCH CSS may be semi-statically configured via higher layer signalling for the subframes other than subframes 0 and 5. The starting symbol, e.g., may be one of 0, 1, 2, or 3. The starting symbol of EPDCCH CSS may be fixed to 0 for the subframes other than subframes 0 and 5.

The starting symbol of the EPDCCH may be configured as follows (e.g., according to or based on the EPDCCH search spaces). For example, the starting symbol of the UE-specific search space may be configured or defined according to the associated common search space. The associated common search space may imply the common search space monitored in a subframe together with the UE-specific search from a UE. There may be different types (e.g. two types) of associated common search spaces including, for example, a PDCCH common search space and an EPDCCH common search space.

If a PDCCH common search space may be monitored in a subframe with EPDCCH UE-specific search space, one or more of the following may apply and/or may be used or provided. The EPDCCH UE-specific search space starting symbol may be configured according to the transmission mode configured for a UE. For example, if a UE may be configured with a legacy transmission mode (e.g. TM 1~9), the UE may follow or use the CIF in PCFICH to figure out or determine the starting symbol for EPDCCH UE-specific search space regardless of the DCI format. If the configured transmission mode may be a different transmission mode (e.g. TM-10 (a CoMP transmission mode)), a UE may be informed and/or may receive via higher layer the EPDCCH starting symbol regardless of the DCI format. The EPDCCH starting symbol may be dependent on the DCI format such that if DCI format 2D is used, the UE may follow or use the higher layer configured EPDCCH starting symbol, otherwise the UE may follow or use the CIF in physical control format indicator channel (PCFICH).

If an EPDCCH common search space may be monitored in a subframe with an EPDCCH UE-specific search space, one or more of following may apply and/or may be provided and/or used. For example, the EPDCCH UE-specific search space starting symbol may be the same as the starting symbol for the EPDCCH common search space. The EPDCCH UE-specific search space starting symbol may be configured as a function of CFI value in PCFICH and EPDCCH common search space starting symbol. The EPDCCH UE-specific search space starting symbol may be independently configured via higher layer signaling irrespective of the EPDCCH common search space starting symbol. The EPDCCH UE-specific search space starting symbol may be configured according to the transmission mode configured for a UE. For example, based on the transmission mode and/or DCI format, a UE may assume the same starting symbol of EPDCCH common search space or may follow or use the starting symbol value configured by higher layer signaling. If a UE may be configured with a legacy transmission mode (e.g. TM1~9), the starting symbol for the UE-specific search space may be the same as the starting symbol of the EPDCCH common search space in the subframe and if a UE may be configured with another transmission mode (e.g. TM10 (a CoMP transmission mode)), the UE may follow or use the starting symbol value configured via higher layer signaling.

The starting symbol of the EPDCCH common search space may further be configured or defined based on at least one of the following. A UE may (e.g., perhaps implicitly) detect the starting symbol of the EPDCCH common search space by decoding the PCFICH in one or more, or each, subframe. A fixed starting symbol may be predefined by assuming that $N_{pdcch}$ OFDM symbols may be occupied for the legacy PDCCH. As such, the starting symbol for EPDCCH common search space may be $N_{pdcch}+1$. The number of OFDM symbols for PDCCH may also include $N_{pdcch}=0$. In a specific carrier type (e.g. a new carrier type in which CRS might not be transmitted in one or more subframes, for example, might not be transmitted in a subframe except for a subframe including PSS/SSS), a UE may assume that the number of OFDM symbols for PDCCH may be $N_{pdcch}=0$. In such scenarios, among others, the EPDCCH common search space starting symbol may be broadcasted in PBCH or SIB-x such that the starting symbol indicated in a broadcasting channel may be used for EPDCCH candidate demodulation in the EPDCCH common search space.

ECCE definition may be different according to the EPDCCH search spaces. In such an embodiment, the ECCE may be defined respectively for the UE-specific search space and the common search space in following manner. For example, an ECCE definition for a UE-specific search space may satisfy one or more of following properties. 16 EREGs may be defined per PRB-pair irrespective of the CP-length and subframe type. 4 or 8 EREGs may be grouped to form an ECCE according to the CP-length and subframe type. 4 EREGs may be grouped to form an ECCE for a normal CP with a normal subframe and/or a normal CP with special subframe configurations (e.g., 3, 4, and 8). For example, 8 EREGs may be grouped to form an ECCE for a normal CP with special subframe configurations (e.g., 2, 6, 7, 9), an extended CP with normal subframe, and/or an extended CP with special subframe configurations (e.g., 1, 2, 3, 5, 6). 4 or 8 EREGs may be grouped to form an ECCE according to the CP-length, subframe type and/or common search space type. For example, if a UE monitors a PDCCH common search space in a subframe, the number of EREGs per ECCE for a UE-specific search space may be 8. If an EPDCCH common search space is monitored together with EPDCCH UE-specific search space, the number of EREGs per ECCE for a UE-specific search space may be 4.

An ECCE definition for common search space may satisfy one or more of following properties. For example, 16 EREGs may be defined per PRB-pair irrespective of the CP-length and subframe type. 4 or 8 EREGs may also be grouped as the same the UE-specific search space. 4 or 8 EREGs may be grouped to form an ECCE according to the number of available REs (e.g. $n_{EPDCCH}$). The number of available REs may be counted in one or more, or each, subframe within a PRB-pair that might not include PSS/SSS and/or PBCH. If $n_{ePDCCH}$ is smaller than a threshold predefined (e.g. 104), 8 EREGs may be grouped to form an ECCE, otherwise 4 EREGs may be used and/or grouped together.

Figure 7:
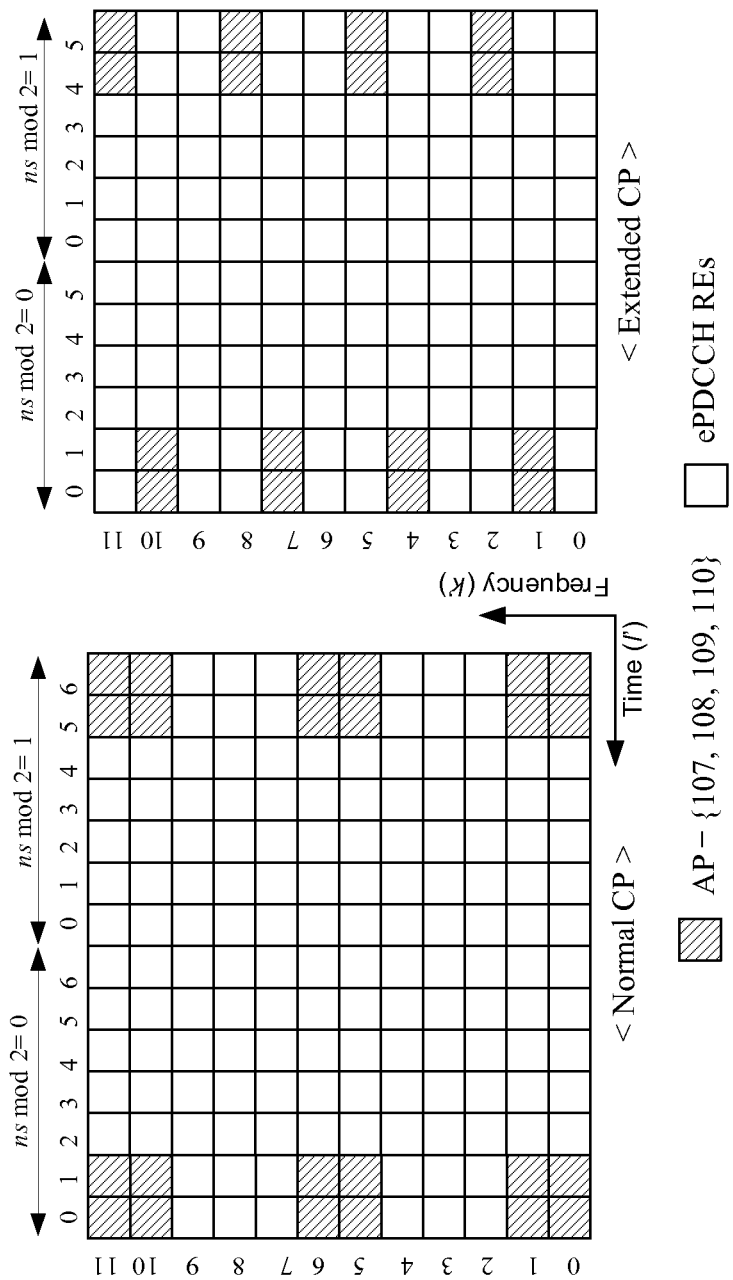
FIG. 7 illustrates an example cell-specific dedicated or demodulating reference signal (DM-RS) pattern for the EPDCCH common search space (CSS).

A cell-specific DM-RS pattern may be defined for supporting EPDCCH CSS as illustrated by example in FIG. 7. As illustrated in FIG. 7, the DM-RS patterns may avoid collision between DM-RS and PSS/SSS so that the EPDCCH CSS may be transmitted in the same PRB-pair with PSS/SSS. A DM-RS pattern that might not collide with PSS/SSS may be used for the same purpose. Although FIG. 7 illustrates an example of a cell-specific DM-RS pattern for EPDCCH CSS, other DM-RS pattern may be used, if the DM-RS does not collide with synchronization channel. The DM-RS pattern not colliding with PSS/SSS may be referred to as "CSS DM-RS". The CSS DM-RS, the cell-specific DM-RS pattern as illustrated by example in FIG. 7 may be used for EPDCCH CSS in the subframe including PSS/SSS. A UE may demodulate EPDCCH CSS based on the CSS DM-RS pattern in the subframe containing PSS/SSS. The UE may demodulate EPDCCH CSS based on, for example the LTE release 11 DM-RS (e.g., antenna ports 107, 108, 109, and 110 may be defined for EPDCCH USS in Rel-11, as illustrated in FIG. 6).

The CSS DM-RS may be used for EPDCCH CSS in the subframe containing PSS/SSS for the PRB-pairs used for PSS/SSS (e.g., center 6 PRB-pairs) transmission if the EPDCCH CSS may be defined/configured in those PRB-pairs, otherwise LTE release 11 DM-RS may be used. A UE may demodulate EPDCCH CSS for REs located in the PRB-pair used for PSS and/or SSS, for example, by using the CSS DM-RS. The UE may demodulate EPDCCH CSS for REs in the PRB-pairs not used for PSS and/or SSS, by using the LTE release 11 DM-RS.

Based on the subframe types and/or PRB pair types, two different DM-RS patterns may be used for EPDCCH CSS. The subframe types may be dependent on whether the subframe includes PSS and/or SSS. The subframe types may be defined, if the subframe is configured as MBSFN subframe. Two subframe types may be used including, for example, a normal subframe and a MBSFN subframe. In an example, the subframe types may be dependent on whether or not the subframe includes CRS. The PRB pair types may be dependent on whether or not the PRB-pair may include PSS and/or SSS.

The CRS may be used for EPDCCH CSS demodulation instead of LTE release 11 DM-RS in the subframe containing CRS and Rel-11 DM-RS is used for EPDCCH CSS demodulation in other subframes. The CRS may be transmitted (e.g., perhaps in some embodiments perhaps only transmitted) in the subset of subframes, thus LTE release 11 DM-RS may be transmitted for EPDCCH CSS in the subframe containing CRS if the PRB-pairs are used for EPDCCH CSS. In this case, one or more of following may apply: The subframe including CRS may be the subframe 0 and 5. A UE may demodulate EPDCCH CSS by using CRS in the subframe including CRS while using LTE release 11 DM-RS for EPDCCH CSS demodulation in other subframes. The EPDCCH CSS using CRS for demodulation may be defined as type-1 EPDCCH CSS. The EPDCCH CSS using LTE release 11 DM-RS for demodulation may be defined as type-2 EPDCCH CSS. A subset of DCIs scrambled with a specific RNTI may be transmitted according to the EPDCCH CSS type. The type-1 EPDCCH CSS may be used for transmitting DCIs scrambled with SI-RNTI and RA-RNTI. The type-2 EPDCCH CSS may be used for transmitting DCIs scrambled with other RNTIs used in PDCCH CSS, for example, P-RNTI, TPC-PUCCH-RNTI, and TPC-PUSCH-RNTI. The CRS for EPDCCH may be transmitted in the center six (6) PRB-pairs and the other PRB-pairs in the subframe might not include CRS.

The MBSFN-RS may be used for EPDCCH CSS demodulation in MBSFN subframes for decoding DCIs scrambled with M-RNTI. Use of MBSFN-RS for demodulation of EPDCCH CSS may be limited to MBSFN subframes with PMCH transmissions, e.g., as specified by higher layers. The MBSFN-RS may be extended to first two symbols of MBSFN subframe for demodulation of EPDCCH CSS. The DM-RS may be included in the first two symbols of MBSFN subframe. In MBSFN subframe, EPDCCH CSS with extended CP may be used to transmit DCI scrambled with M-RNTI, e.g., as scheduled by higher layers.

The DM-RS sequence may be defined according to or based on the EPDCCH search space types. For example, according to the EPDCCH search space type, one or more of following may apply and/or may be used and/or provided. A UE-specific DM-RS sequence may be configured for the UE-specific search space and cell-specific DM-RS sequence may be used for the common search space. The sequence initialization $c_{init}$ for a UE-specific search space may be defined as $c_{init}=(\lfloor n_s/2 \rfloor+1)\cdot(2n_{ID}^{EPDCCH}+1)\cdot 2^{16}+n_{SCID}^{EPDCCH}$ where $n_{ID}^{EPDCCH}$ may be configured via higher layer per EPDCCH resource set and $n_{ID}^{EPDCCH}$ may be a fixed number (e.g., 0, 1, or 2). For the EPDCCH common search space, $n_{ID}^{EPDCCH}$ may be defined as a function of the physical cell-ID and $n_{ID}^{EPDCCH}$ may be a fixed number (e.g., 0, 1, or 2). For example, $n_{ID}^{EPDCCH}$ may be or may be equal to the physical cell ID.

A UE-specific search space and common search space may be configured with a UE-specific DM-RS sequence or a cell-specific DM-RS sequence. If multiple (e.g. two) EPDCCH resource sets may be configured for the EPDCCH UE-specific search space and an (e.g. one) EPDCCH resource set may be used for the EPDCCH common search space, one or more of following may apply and/or may be used and/or provided. For example, the sequence initialization $c_{init}$ for a UE-specific search space may be defined in a UE-specific manner for one or more, or each, EPDCCH resource sets, if the EPDCCH UE-specific resources are not overlapped with EPDCCH common search space resources. In such scenarios, among others, the sequence initialization $c_{init}$ for a UE-specific search space may be defined as $c_{init}=(\lfloor n_s/2 \rfloor+1)\cdot(2n_{ID}^{EPDCCH}+1)\cdot 2^{16}+n_{SCID}^{EPDCCH}$ where $n_{ID}^{EPDCCH}$ may be configured, e.g., via the higher layer per EPDCCH resource set and $n_{SCID}^{EPDCCH}$ may be a fixed number (e.g., 0, 1, or 2).

For an EPDCCH UE-specific search space resource set that may be fully and/or partially overlapped with an EPDCCH common search space resource, the sequence initialization $c_{init}$ for a UE-specific search space may be defined as the same as the EPDCCH common search space DM-RS sequence initialization. If the EPDCCH common search uses a cell-specific DM-RS sequence, the UE-specific DM-RS sequence for the EPDCCH resource set overlapped with common search space may use the cell-specific DM-RS sequence. The sequence initialization $c_{init}$ for a UE-specific search space, if the UE-specific search space is not overlapped with EPDCCH common search space, may be defined as $c_{init}=(\lfloor n_s/2 \rfloor+1)\cdot(2n_{ID}^{EPDCCH}+1)\cdot 2^{16}+n_{SCID}^{EPDCCH}$, where $n_{ID}^{EPDCCH}$ may be configured via higher layer per EPDCCH resource set and $n_{SCID}^{EPDCCH}$ may be a fixed number (e.g., 0, 1, or 2).

If the UE-specific search space is overlapped with EPDCCH common search space, the sequence initialization $c_{init}$ for a UE-specific search space may be defined as $c_{init}=(\lfloor n_s/2 \rfloor+1)\cdot(2n_{ID}^{EPDCCH}+1)\cdot 2^{16}+n_{SCID}^{EPDCCH}$, where $n_{ID}^{EPDCCH}$ may be defined as a function of the physical cell-ID, and $n_{SCID}^{EPDCCH}$ may be a fixed number (e.g. 0, 1, or 2). For example, $n_{ID}^{EPDCCH}$ may be equal to the physical cell ID.

The CSS may be the same for one or more, or each, of the UEs monitoring EPDCCH CSS and/or multiple ECCE aggregation levels may be used. Among the supported aggregation levels for EPDCCH CSS, the subset of aggregation levels may be supported according to the type of RNTI. A DCI for broadcasting channel may have larger aggregation set as compared with the others. For example, ECCE aggregation levels (e.g., 4, 8, 16, and/or 32) may be supported for EPDCCH CSS and the aggregation levels (e.g., 16, 32) may be used for DCIs scrambled with SI-RNTI and RA-RNTI. The aggregation levels (e.g., 4 and/or 8) may be used for DCIs scrambled with other RNTIs (e.g., TPC-PUCCH-RNTI and TPC-PUSCH-RNTI). A DCI for broadcasting channel may have the fixed set of aggregation levels (e.g., 16, 32). The other DCIs may have the configured set of aggregation levels so that a UE may monitor DCIs scrambled with SI-RNTI and RA-RNTI in the aggregation levels (e.g., 16, 32). The UE may monitor other DCIs in the higher layer configured aggregation levels.

The aggregation levels for broadcasting channels may be defined as a function of the number of PRB pairs for EPDCCH CSS. For example, if 4 PRB-pairs are used for EPDCCH CSS, the aggregation level set used for the DCIs scrambled with SI-RNTI and RA-RNTI may be (8, 16), and if 8 PRB-pairs are used for EPDCCH CSS, the aggregation level set used for the DCIs scrambled with SI-RNTI and RA-RNTI may be (16, 32). This might not be restricted to the DCIs scrambled with SI-RNTI and RA-RNTI and may be used for other CSS based DCIs.

A RNTI may be defined such as MIB-RNTI that may be used to carry the system information in PBCH including, e.g., downlink bandwidth, PHICH configuration, SFN number etc. The DCI scrambled with MIB-RNTI may be transmitted in predefined subframes and ECCEs in EPDCCH CSS. The MIB-RNTI may be replaced with a fixed RNTI, as the location may be predefined so that a UE might not check whether it is scrambled with MIB-RNTI. The MIB-RNTI may be replaced with two or more of candidate scrambling sequences so that one or more of information bits may be transmitted in the scrambling sequence. For example, the LSB (Least Significant Bit) k-bit of SFN may be transmitted by using the CRC scrambling sequence. Assuming that 2-bit LSB of SFN may be informed by the CRC scrambling sequence, 4 candidate scrambling sequences (e.g., c1, c2, c3, and c4) may be used. If a UE detects c1 in a specific radio frame for the DCI used for MIB information, the UE may assume that the LSB of SFN in the radio frame is "00". The DCI for MIB information may be repetitively transmitted over one or more, or multiple, subframes and/or radio frames. The DCI may include the MIB information including at least one of downlink system bandwidths in terms of the number of PRB-pairs, SFN related information, and EPDCCH CSS configuration information. The DCI for MIB information may indicate that a PDSCH may include MIB information, so that a UE may demodulate PDSCH to receive MIB information in the PRBs indicated from the DCI. The MIB-RNTI may be used for the DCI and the DCI may be transmitted in the predefined subframes, while the frequency location might not be predefined.

One or more, or multi (e.g., two), dimensional ECCE aggregations may be supported, perhaps for example so that increased aggregation levels (e.g., "maximum aggregation levels") may be extended. The ECCEs may be aggregated over multiple subframes. For example, perhaps if 16 ECCEs are available for EPDCCH CSS in one or more, or each, subframe, aggregation level 32 may be supported by aggregating ECCEs over at least two consecutive subframes, among other scenarios. In another example, the aggregation 16 may be supported by aggregating 8 ECCEs in the first subframe and the other 8 ECCEs in the second subframe.

The two dimensional ECCE aggregations may be used for the DCI scrambled with a specific RNTI. For example, the DCI scrambled with MIB-RNTI may be transmitted over two or more of subframes. The number of subframes where ECCEs may be aggregated may be configured as a function of the number of PRB pairs used for EPDCCH CSS. The number of subframes where ECCEs may be aggregated may be configured, e.g., via higher layer signaling. The other DCIs might not use two dimensional ECCE aggregations. The two dimensional ECCE aggregations may be used by eNB configuration. A broadcasting channel (e.g., MIB or SIB) may indicate whether the ECCE aggregation is based on one dimensional or two dimensional.

The ECCE aggregation level set may be configured and/or defined as a function of the number of the available REs in the subframe. The aggregation level set may be different from a subframe to another. A UE may monitor an aggregation level set (e.g., 4 and/or 8) for EPDCCH CSS in a subframe, perhaps for example if the number of available REs is equal to or larger than a threshold (e.g., predefined threshold), among other scenarios. The UE may monitor different aggregation level set (e.g., 8 and/or 16) in the other subframe, perhaps for example if the number of available RE is smaller than the threshold, among other scenarios.

The number of available REs may be counted for EPDCCH CSS and EPDCCH USS. For example, the RE for CSI-RS might not be counted as the available RE for EPDCCH USS, the RE for CSI-RS may be counted as the available RE for EPDCCH CSS. In the same subframe, the available RE count in a PRB-pair may be different in EPDCCH USS and EPDCCH CSS. One or more different threshold values (e.g., predefined threshold) may be used to define the aggregation level set for EPDCCH CSS and/or EPDCCH USS. For example, 104 may be used as the threshold for EPDCCH USS, and other number, for example 144, may be used for the threshold for EPDCCH CSS.

In some embodiments, the EPDCCH CSS may be transmitted in the PDSCH region so that the RE for the EPDCCH CSS may collide with other signaling including CSI-RS, CRS, PSS/SSS, PBCH, PRS, etc. If the EPDCCH CSS REs collide with other signals, the REs colliding with CSI-RS (e.g., including zero-power CSI-RS) may be used for EPDCCH CSS (instead of EPDCCH USS). A UE may consider the REs colliding with CSI-RS as available RE for CSS (instead of USS). When a UE receives a DCI in a USS, the REs for CSI-RS may be rate-matched around, and the REs for CSI-RS may be punctured for CSS.

The REs located in the PRB-pair containing PSS and/or SSS might not be used for EPDCCH USS. The REs may be used for EPDCCH CSS. A UE may monitor EPDCCH in USS. The EPDCCH USS resources may be overlapped with the PRB pair including PSS and/or SSS. The UE may skip decoding for the EPDCCH candidates for EPDCCH USS located in the PRB-pair containing PSS and/or SSS. A UE may monitor EPDCCH in CSS and the EPDCCH CSS resources may be overlapped with the PRB pair including PSS and/or SSS, the UE may be decoding EPDCCH candidates for EPDCCH CSS located in the PRB-pair including PSS/SSS. The REs located in the PRB-pair including PRS might not be used for EPDCCH USS and/or CSS. The other PRB pairs in the same subframe may be used for EPDCCH CSS. A UE behavior receiving EPDCCH in USS and CSS may be different in the subframe containing PRS. A UE may be allowed to skip decoding EPDCCH candidates in the subframe containing PRS, if the EPDCCH candidates are in USS. A UE may monitor EPDCCH candidates for CSS in the subframe containing PRS, if the PRB pairs for EPDCCH candidates do not include PRS.

The rate-matching and/or puncturing techniques may be defined according to the EPDCCH search space types. For example, the rate-matching and puncturing techniques may be defined differently, if the search space is a USS or CSS. For example, different rate-matching and/or puncturing techniques may be applied for a USS than for a CSS. For the USS, the REs may be configured as EPDCCH USS resources, and the REs that may collide with PDCCH, CSI-RS, zero-power CSI-RS, and DM-RS may be rate-matched around. For the CSS, for example the REs may be configured as EPDCCH CSS resources, and the REs located in the CRS position may be rate-matched around. Irrespective of the number of CRS port detected in PBCH, for example, four CRS ports may be used. When demodulating EPDCCH common search space, a UE may assume that the REs located in the CRS ports 0-3 may be rate-matched around. A UE may follow and/or use the number of CRS ports detected in PBCH for rate-matching of the REs located in the CRS ports.

For a CSS where the REs may be configured as EPDCCH CSS resources, the REs located in the CSI-RS and zero-power CSI-RS may be punctured. If a UE may be configured with CSI-RS and/or zero-power CSI-RS, the REs in those locations may be punctured.

For the CSS and the PDCCH, if a UE may monitor a PDCCH CSS with an EPDCCH CSS, the UE may rate-match around for the REs located in the PDCCH locations. The UE may rate-match around for the REs located in the OFDM symbols below the EPDCCH CSS starting symbols.

In a carrier type, for example perhaps if CRS is not transmitted, PBCH might not be supported as it may require CRS for demodulation. EPDCCH CSS may be used for carrying system information in MIB which may be transmitted, e.g., via PBCH. The MIB, in the carrier type, may comprise one or more of following information in the carrier type, including, for example, downlink system bandwidth in terms of number of PRB-pairs, ePHICH configuration, EPDCCH CSS configuration, SFN, SIB location, SI scheduling, etc.

One or more embodiments contemplate a DCI format (e.g., perhaps a new format like a DCI format 5) may be defined that may include the information that may be needed for initial cell access. The new DCI format for MIB transmission may be encoded with tail-biting convolution code and 16 bits CRC may be attached. The 16 bit CRC may be scrambled with MIB specific RNTI (e.g., MIB-RNTI).

The DCI format 5 may may carry MIB information and/or may be transmitted in the predefined time/frequency location within an EPDCCH CSS. For example, ECCEs 0 to 15 in the EPDCCH CSS may be used for the transmission of the DCI format 5 carrying MIB information in the predefined subframes. A UE may receive the DCI format with aggregation level 16 (e.g., using ECCEs 0 to 15) in the EPDCCH CSS. If a UE fails to receive DCI format 5 within a subframe, the UE may accumulate the signal within a predefined time window size. For example, the window size may be defined as a 4 radio frames (e.g., consecutive), the DCI format 5 may be transmitted in one subframe in one or more, or each, of the radio frames. A UE may accumulate the signal up to four times. The window size may vary according to the configuration. For example, the window size may be defined as a function of physical cell ID. A UE may detect physical cell-ID (PCI) from the synchronization channel. The window size for MIB detection via EPDCCH CSS may be obtained by using modulo operation of physical cell-ID. The PCIs may be grouped according to the MIB window size so that the PCIs may be chosen correctly at the beginning of cell planning according to the cell size and/or interference level.

The LSB of SFN number may be implicitly indicated to a UE, perhaps for example if the window size may be larger than one radio frame, among other scenarios. For example, if the window size is $N_w$ radio frame, $N_w$ scrambling sequences may be reserved and according to the radio frame number, the corresponding scrambling sequence may be used. A UE may figure out the LSB of SFN, perhaps for example based on the scrambling sequence used in a radio frame within the window size, among other factors.

The starting ECCE numbers for CSS may change according to the radio frame number. For example, the starting ECCE number may be '0' in the first radio frame in the window size, and the starting ECCE number may be '1' in the second radio frame. If a UE detects the DCI format 5, the UE may determine the SFN number for that radio frame. The DCI format 5 may be transmitted within centre 6 RBs even when the number of PRB pairs for EPDCCH CSS is larger than 6. The ECCE numbers for the DCI format 5 detection may start from 0 in the first PRB pair for EPDCCH CSS in the centre 6 PRB pairs. The EPDCCH CSS used for DCI format 5 may be considered as, e.g., type-1 EPDCCH CSS, which may be different from the other EPDCCH CSS (e.g., type-2) used for other DCI formats. The type-1 EPDCCH CSS and the type-2 EPDCCH CSS may be overlapped and the type-1 EPDCCH CSS may have higher priority, when two types of EPDCCH CSS are overlapped.

The DCI format 5 may include the SFN value or a fixed number of most significant bits of the SFN. The remaining bits may be derived from the frame location of the repeated MIB as decoded by the UE.

The system information may be transmitted, e.g., via EPDCCH and PDSCH by using SI-RNTI. The DCI format 1A or DCI format 1C may be used. A UE may receive the scheduling information for SIB-1 from the DCI format in a subframe. The DCI for SIB-1 may be transmitted with a duty cycle. A UE may monitor the DCI for SIB-1 in a subset of subframes. A UE may receive the scheduling information of the DCI for SIB-1 from the DCI for MIB, for example perhaps when EPDCCH CSS is used for the DCIs related to SIB, among other scenarios. A UE may start to receive DCI for SIB-1 upon reception of DCI for a MIB. When EPDCCH CSS is used for the DCIs related to SIB, a UE may receive the DCI for SIB-1, e.g., via PDCCH CSS, if the subframe includes CRS. The UE may receive the DCI for SIB-1, e.g., via EPDCCH CSS in other subframes.

SIB may be received by UE without MIB information, which may imply that the MIB information might not be available when a UE may start receiving SIB. The SIB-1 may include, for example, downlink system bandwidth in terms of number of PRB-pairs, ePHICH configuration, type-2 EPDCCH CSS configuration, etc. The DCI for SIB-1 may be transmitted in a predefined time/frequency location. For example, the DCI for SIB-1 may be transmitted in the centre 6 PRB-pairs in a subset of subframes. Subframe 1 may include the DCI for SIB-1 in one or more, or each, of the radio frames. Multiple of SI-RNTI may be used to indicate downlink system bandwidth. For example, 6 RNTIs may be reserved for SI-RNTI (e.g., SI-RNTI-1, SI-RNTI-2, SI-RNTI-3, SI-RNTI-4, SI-RNTI-5, SI-RNTI-6). One or more, or each, of the reserved RNTIs may correspond to a downlink bandwidth (e.g., 6, 15, 25, 50, 75, 100) in terms of the number of PRB-pairs. If a UE receives DCI for SIB-1 via SI-RNTI-3, the UE may assume that system bandwidth may be 25 PRB pairs and the resource allocation information may be interpreted accordingly. The PDSCH for SIB-1 may be located within centre 6 PRB-pairs. The resource allocation in the DCI for SIB-1 may be fitted to the 6 PRB-pair.

A MBSFN subframe may be defined as the subframe not containing CRS in the first two OFDM symbols. The extended CP may be used irrespective of the CP length in the subframe 0 in a radio frame.

A UE may monitor EPDCCH based on normal CP in non-MBSFN subframe, if the subframe 0 is normal CP subframe. The UE may monitor EPDCCH based on extended CP in MBSFN subframe. If the subframe 0 is normal CP in a radio frame, a UE may monitor EPDCCH USS with normal CP in non-MBSFN subframe. The UE may skip decoding EPDCCH USS in MBSFN subframe. The UE may monitor EPDCCH CSS in the MBSFN subframe with extended CP. The EPDCCH CSS in the MBSFN subframes may support a subset of DCI formats, so that a UE may monitor the supporting DCI formats in the EPDCCH CSS in the MBSFN subframes. The DCI formats supported in the EPDCCH CSS may include the DCIs scrambled with TPC-PUSCH/PUCCH-RNTI and P-RNTI. The DCIs scrambled with SI-RNTI and RA-RNTI might not be supported in the EPDCCH CSS in the MBSFN subframes. The DCIs scrambled with SI-RNTI and RA-RNTI may be transmitted in the EPDCCH CSS in the non-MBSFN subframes.

A UE may be configured to monitor EPDCCH CSS to detect blindly for the DCI scrambled with M-RNTI. A UE may be configured to monitor one or more EPDCCH USSs for DCIs related to UL grants and/or power control information. EPDCCH USS DCI may be scrambled with C-RNTI. The transmissions in the MBSFN subframe may occur with extended CP for the entire subframe.

Multiple (e.g., two) sets of USSs may be configured. Multiple (e.g., two) EPDCCH USS sets may be used in different subframes and the subframes for the USS sets may be mutually exclusive. A UE may monitor one EPDCCH USS set in a subframe. For example, if the first EPDCCH USS set is located in the subframe (e.g., 0, 1, 4, 5, 6, 9), the second EPDCCH USS set may be located in the subframes (e.g., 2, 3, 7, 8). The first EPDCCH USS set may be referred to as NCP USS (normal-CP EPDCCH USS set). The second EPDCCH USS set may be referred to as ECP USS (extended-CP EPDCCH USS set). For example, the ECP USS, if configured, may be used for MBSFN subframe. The ECP USS may be configured in a subset of MBSFN subframe and the subframe configuration may be informed, e.g., via broadcasting channel or higher layer signalling. In an example, two EPDCCH USS sets may be used, if the subframe 0 is a normal CP and MBSFN subframe is configured. If MBSFN subframe is not configured in the system or the subframe 0 is extended CP, NCP USS or ECP USS may be configured in the system.

The NCP USS may be transmitted with normal CP. The ECP USS may be transmitted with extended CP. For example, if a UE is configured with two EPDCCH USS sets, e.g., NCP USS and ECP USS, the UE may demodulate with normal CP or extended CP according to the EPDCCH USS set. For example, if NCP USS and ECP USS are located in a radio frame, a UE may decode EPDCCH candidates with normal CP in the NCP USS, or the UE may decode EPDCCH candidates with extended CP.

ECP USS may support a subset of DCI formats, perhaps for example if NCP USS and/or ECP USS may be configured, among other scenarios. For example, the subset of DCI formats may be uplink grant related DCI format such as DCI format 0/4 scrambled C-RNTI and/or DCI format 3/3A scrambled with TPC-PUSCH-RNTI and TPC-PUCCH-RNTI. The subset of DCI formats may be the DCI format scrambled with M-RNTI and uplink grant related DCI formats. For example, if the MBSFN subframe is used for PMCH transmission, the subframe may be configured with extended CP. Using MBSFN-RS for demodulation, the non-MBMS UE may monitor and demodulate EPDCCH in USS configured for extended CP. The UE might not expect to demodulate any DCIs in the EPDCCH USS that are configured for normal CP.

In an example, a UE may monitor and demodulate USS configured for normal CP and retrieve a DL grant. The UE may use normal DM-RS for EPDCCH USS. Based on the DL grant, using normal CP, the UE may receive PDSCH transmission in the MBSFN subframe. If the subframe 0 is normal CP subframe, a UE may monitor EPDCCH based on normal CP in a non-MBSFN subframe, while the UE may skip monitoring EPDCCH in MBSFN subframes. The DCI related to uplink grant in MBSFN subframe may be transmitted in the previous non-MBSFN subframe. The previous non-MBSFN subframe may be the latest non-MBSFN subframe before the MBSFN subframe. In an example, the DCI may include a bit field which may indicate that the DCI is targeted for which subframe so that a UE may be informed that the DCI corresponds to which uplink subframe. Multiple C-RNTI may be configured for a UE, for example, C-RNTI-1 and C-RNTI-2. If a DCI related to uplink grant scrambled with C-RNTI-1 is received in subframe n, the UE may transmit PUSCH in the uplink subframe n+4. If the UE receives a DCI related to uplink grant scrambled with C-RNTI-2 in subframe n, the UE may transmit PUSCH in the uplink subframe n+4+offset, where the offset may be predefined or may be configurable.

In a previous non-MBSFN subframe, the subframe may include multiple EPDCCH USSs, perhaps for example so that one EPDCCH USS may be tied with the non-MBSFN subframe and/or the other EPDCCH USS may be tied with MBSFN subframe(s). For example, if the subframe 'n' is a non-MBSFN subframe and subframe 'n+1' is a MBSFN subframe, two EPDCCH USS may be defined in the subframe 'n.' One EPDCCH USS may be associated with the subframe 'n' and the other EPDCCH USS may be associated with the subframe 'n+1'.

The EPDCCH USS for the MBSFN subframe, for example, may be located in subframe 0 or subframe 5 in the radio frame. For example, if the MBSFN subframe is located within subframe 1 to 4, the EPDCCH USS for the MBSFN subframe may be located in the subframe 0, or the EPDCCH USS may be located in the subframe 5.

Figure 8A:
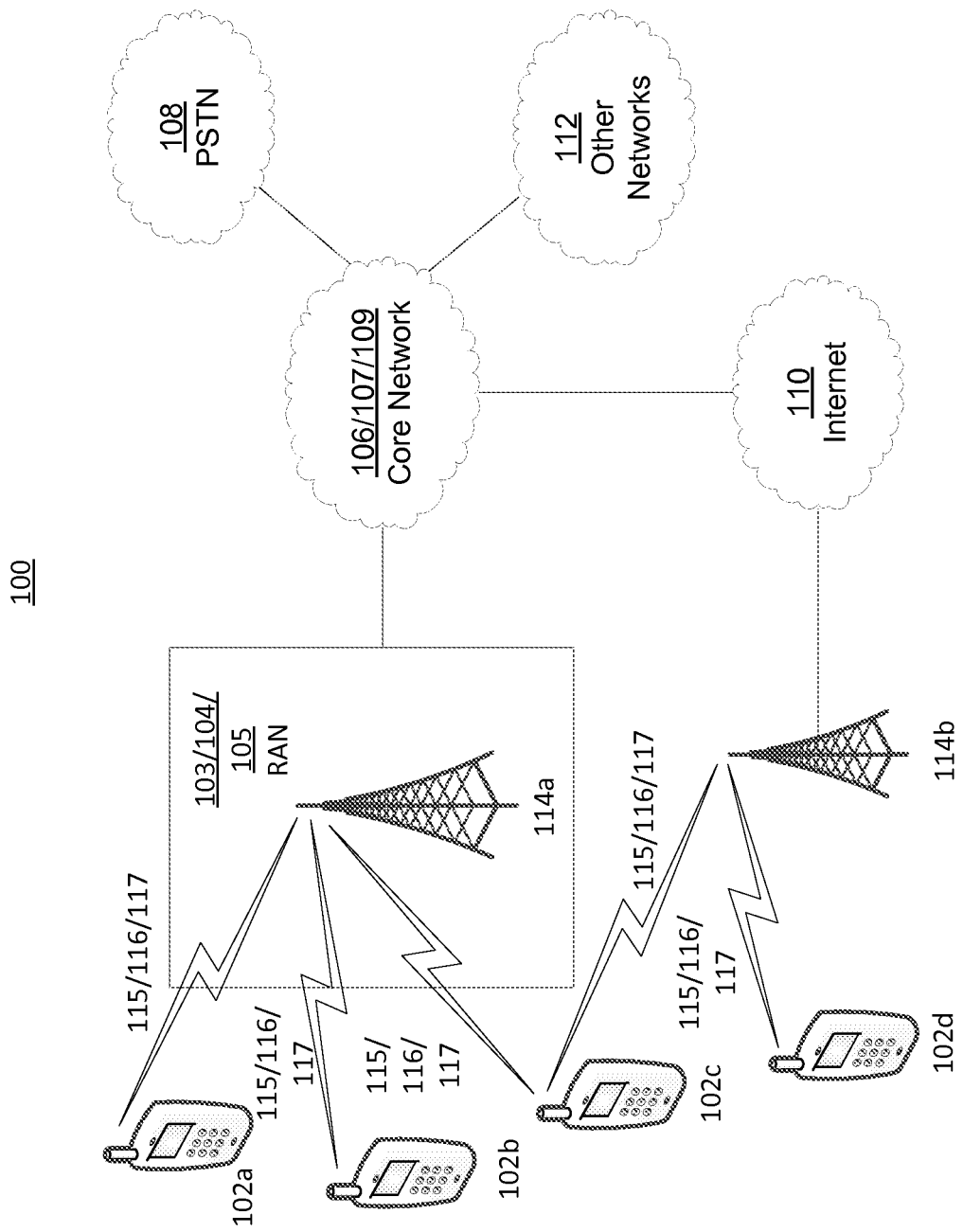
FIG. 8A is a system diagram of an example communications system in which one or more disclosed embodiments may be implemented.

FIG. 8A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 8A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 8A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 8A may be configured to communicate with the base station 114a, which may employ a cellular-based radio technology, and with the base station 114b, which may employ an IEEE 802 radio technology.

Figure 8B:
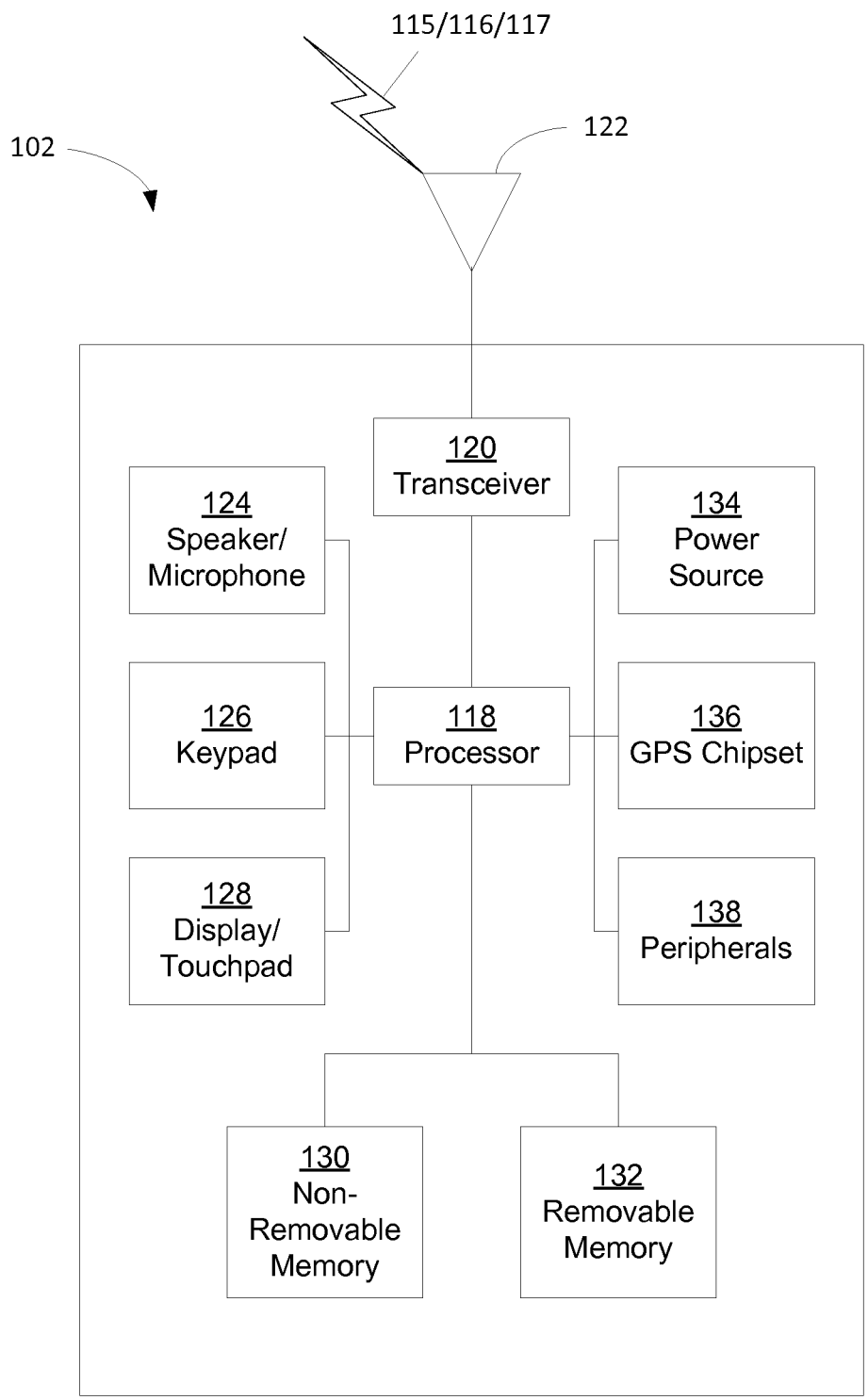
FIG. 8B is a system diagram of an example wireless transmit/receive unit (WTRU) that may be used within the communications system illustrated in FIG. 8A.

FIG. 8B is a system diagram of an example WTRU 102. As shown in FIG. 8B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 8B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
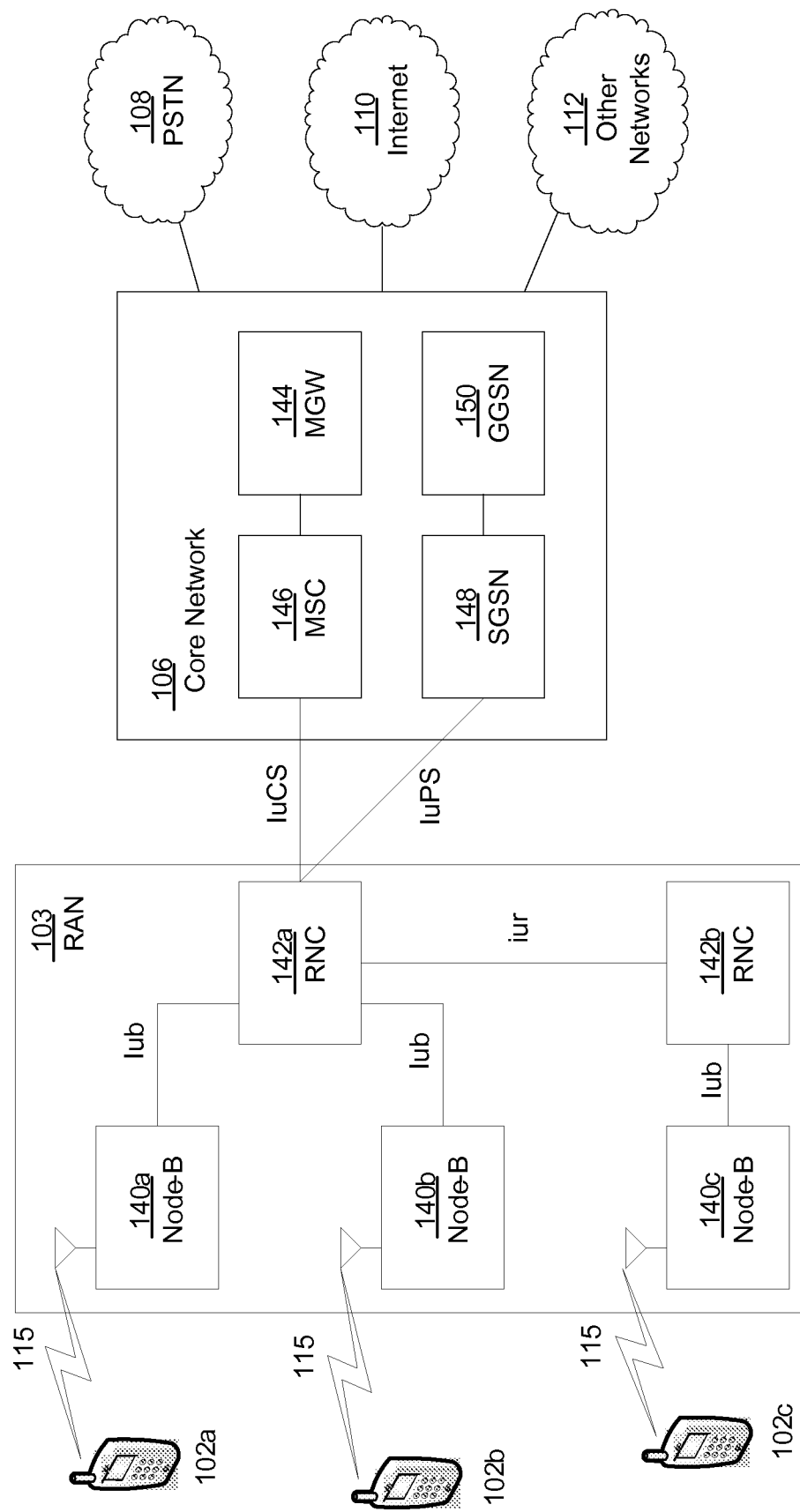
FIG. 8C is a system diagram of an example radio access network and an example core network that may be used within the communications system illustrated in FIG. 8A.

FIG. 8C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 8C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 8C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 8C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 8D:
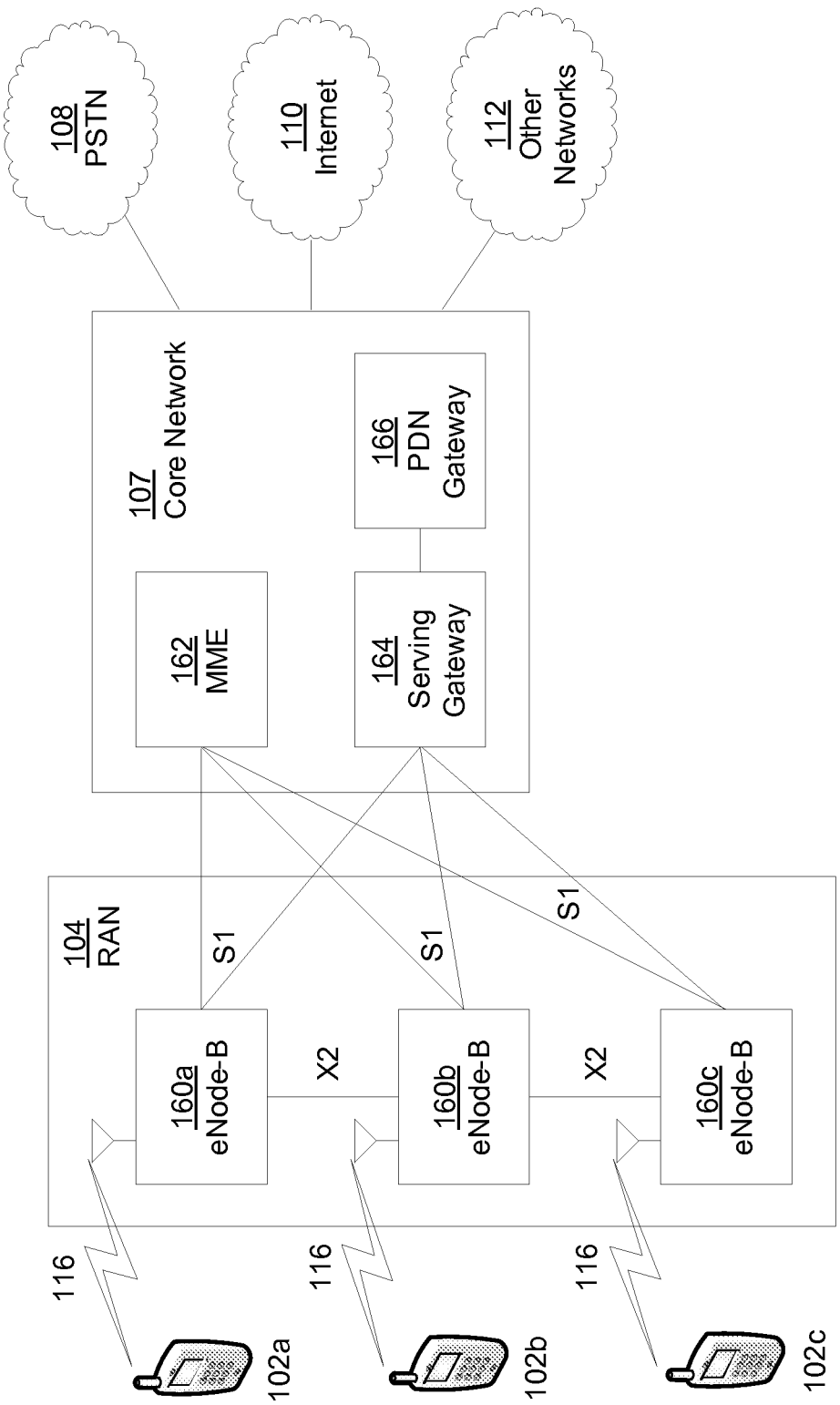
FIG. 8D is a system diagram of an example radio access network and an example core network that may be used within the communications system illustrated in FIG. 8A.

FIG. 8D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 8E:
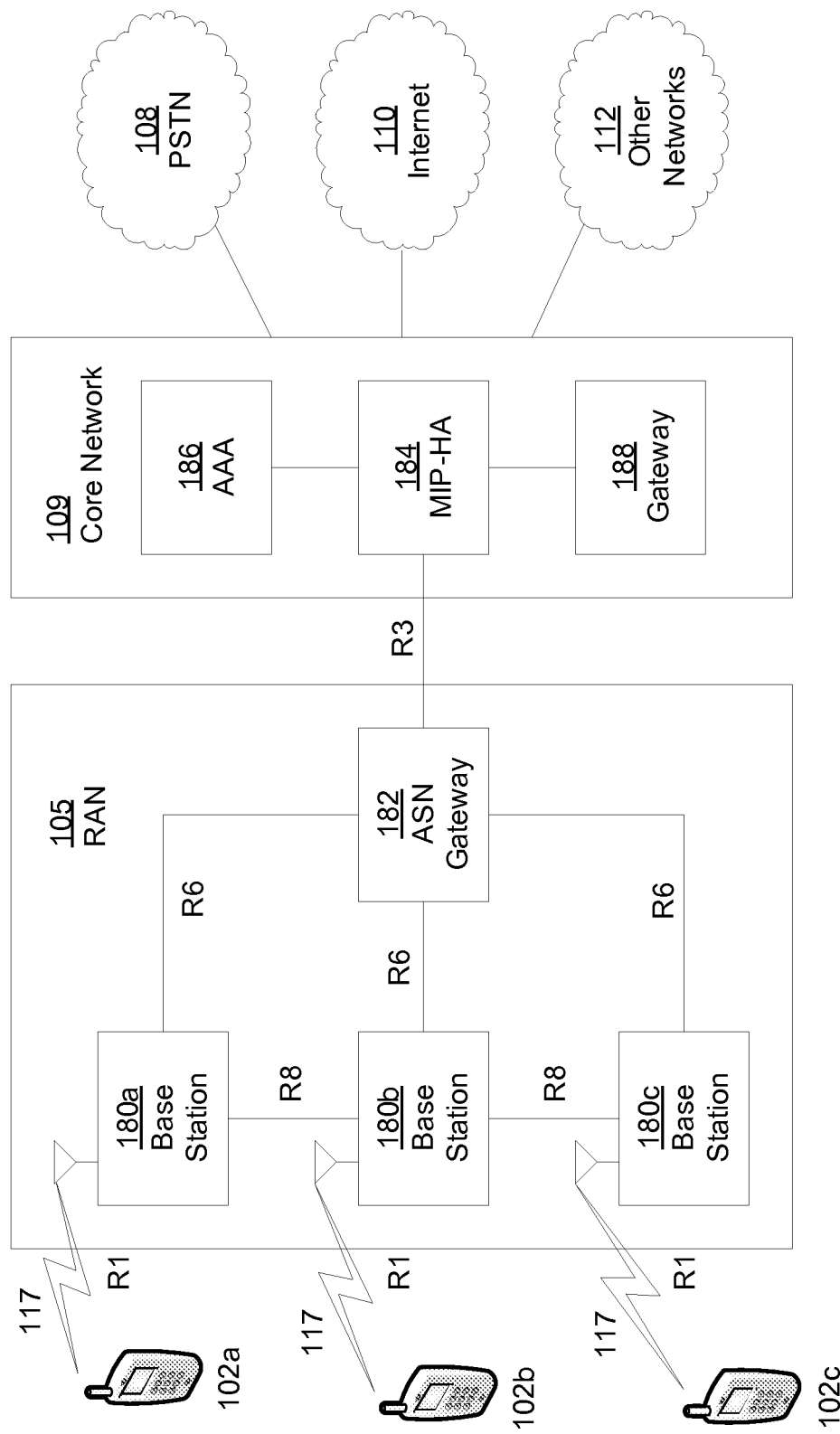
FIG. 8E is a system diagram of an example radio access network and an example core network that may be used within the communications system illustrated in FIG. 8A.

FIG. 8E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 8E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method implemented in a wireless transmit/receive unit (WTRU), the method comprising:
   receiving first information, wherein the first information indicates a first type common search space (CSS) of a channel, and wherein the channel is an enhanced physical downlink control channel;
   receiving second information, wherein the second information is received via the first type CSS;
   determining, from the second information that is received via the first type CSS, a first type downlink control information (DCI) and a system information;
   determining, from the system information, a second type CSS of the channel;
   receiving third information, wherein the third information is received via the second type CSS; and
   determining, from the third information that is received via the second type CSS, a second type DCI.

2. The method of claim 1, further comprising receiving the first information via a Master Information Block (MIB).

3. The method of claim 1, further comprising:
   receiving a demodulation reference signal (DM-RS) sequence associated with the channel, and
   initializing the DM-RS sequence for one or more of the common search spaces using physical cell identifier parameters.

4. The method of claim 1, further comprising monitoring one or more of the common search spaces for one or more two-dimensional enhanced control channel elements (eCCEs) over at least two consecutive subframes at an aggregation level.

5. The method of claim 1, wherein the first type DCI is scrambled with a System Information Radio Network Temporary Identifier (SI-RNTI).

6. The method of claim 1, wherein the second type DCI is scrambled with a Random Access Radio Network Temporary Identifier (RA-RNTI) or a Paging Radio Network Temporary Identifier (P-RNTI).

7. The method of claim 1, wherein the first information comprises a frequency location of the first type CSS.

8. The method of claim 1, further comprising using at least one of the first type DCI or the second type DCI.

9. A wireless transmit/receive unit (WTRU), comprising:
   a memory;
   a receiver; and
   a processor, configured at least to:
      receive first information, wherein the first information indicates a first type common search space (CSS) associated with a channel, and wherein the channel is an enhanced physical downlink control channel;
      receive second information, wherein the second information is received via the first type CSS;
      determine, from the second information that is received via the first type CSS, a first type downlink control information (DCI) and a system information;
      determine, from the system information, a second type CSS associated with the channel;
      receive third information, wherein the third information is received via the second type CSS; and
      determine, from the third information that is received via the second type CSS, a second type DCI.

10. The WTRU of claim 9, wherein the processor is further configured to receive the first information via a Master Information Block (MIB).

11. The WTRU of claim 9, wherein the processor is further configured to:
   receive a demodulation reference signal (DM-RS) sequence associated with the channel, and
   initialize the DM-RS sequence for one or more of the common search spaces using physical cell identifier parameters.

12. The WTRU of claim 9, wherein the processor is further configured to monitor one or more of the common search spaces for one or more two-dimensional enhanced control channel elements (eCCEs) over at least two consecutive subframes at an aggregation level.

13. The WTRU of claim 9, wherein the first type DCI is scrambled with a System Information Radio Network Temporary Identifier (SI-RNTI).

14. The WTRU of claim 9, wherein the second type DCI is scrambled with a Random Access Radio Network Temporary Identifier (RA-RNTI) or a Paging Radio Network Temporary Identifier (P-RNTI).

15. The WTRU of claim 9, wherein the first information comprises a frequency location of the first type CSS.

16. The WTRU of claim 9, wherein the processor is further configured to use at least one of the first type DCI or the second type DCI.

* * * * *